United States Patent
Bai et al.

(10) Patent No.: US 12,108,269 B2
(45) Date of Patent: Oct. 1, 2024

(54) DISTRIBUTED ANTENNA PANEL MEASUREMENT AND REPORTING

(71) Applicant: QUALCOMM Incorporated, San Diego, CA (US)

(72) Inventors: Tianyang Bai, Somerville, NJ (US); Yan Zhou, San Diego, CA (US); Aleksandar Damnjanovic, Del Mar, CA (US); Jelena Damnjanovic, Del Mar, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 17/146,242

(22) Filed: Jan. 11, 2021

(65) Prior Publication Data

US 2022/0225141 A1    Jul. 14, 2022

(51) Int. Cl.
*H04L 12/00*     (2006.01)
*H04L 5/00*      (2006.01)
*H04W 24/08*     (2009.01)
*H04W 24/10*     (2009.01)
*H04W 84/12*     (2009.01)

(52) U.S. Cl.
CPC ........... *H04W 24/10* (2013.01); *H04L 5/0048* (2013.01); *H04W 24/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2016/0198455 A1 * | 7/2016 | Caretti | H04W 72/21 370/329 |
| 2018/0054237 A1 * | 2/2018 | Tseng | H04B 7/026 |
| 2019/0097701 A1 * | 3/2019 | Kim | H04L 5/0048 |
| 2020/0235961 A1 * | 7/2020 | Kim | H04L 5/0051 |
| 2020/0359428 A1 * | 11/2020 | Pan | H04W 76/10 |
| 2020/0374858 A1 | 11/2020 | Vargas et al. | |
| 2021/0314917 A1 * | 10/2021 | Lee | H04W 24/08 |
| 2022/0022198 A1 * | 1/2022 | Ji | H04W 72/085 |
| 2022/0278719 A1 * | 9/2022 | Li | H04W 4/40 |

FOREIGN PATENT DOCUMENTS

WO    WO-2021044382 A1 *    3/2021    ........... H04B 7/0404

OTHER PUBLICATIONS

International Search Report and Written Opinion—PCT/US2021/073064—ISA/EPO—May 9, 2022.

* cited by examiner

*Primary Examiner* — Noel R Beharry
*Assistant Examiner* — Lionel Preval
(74) *Attorney, Agent, or Firm* — Patterson + Sheridan, LLP

(57) ABSTRACT

Certain aspects of the present disclosure provide techniques for wireless communication. Particular aspects provide for a method, including sending, from a first user equipment to a second user equipment, a measurement configuration for an antenna panel of the second user equipment; receiving, at the first user equipment from the second user equipment, a remote antenna panel measurement report based on the measurement configuration; and sending, from the first user equipment to a network, a first measurement report comprising the remote antenna panel measurement report.

30 Claims, 14 Drawing Sheets

DISTRIBUTED ANTENNA PANEL MEASUREMENT AND REPORTING

BACKGROUND

Aspects of the present disclosure relate to wireless communications, and more particularly, to techniques for performing distributed antenna panel measurement and reporting.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

A first aspect provides a method for wireless communications, comprising: sending, from a first user equipment to a second user equipment, a measurement configuration for an antenna panel of the second user equipment; receiving, at the first user equipment from the second user equipment, a remote antenna panel measurement report based on the measurement configuration; and sending, from the first user equipment to a network, a first measurement report comprising the remote antenna panel measurement report.

A second aspect provides a method for wireless communications, comprising: sending, from a first user equipment to a network, a request for a measurement configuration for a remote antenna panel; receiving, at the first user equipment from the network, a measurement configuration for the remote antenna panel; and sending, from the first user equipment to a second user equipment, the measurement configuration for the remote antenna panel, wherein the second user equipment comprises the remote antenna panel.

A third aspect provides a method for wireless communication, comprising: receiving, at a second user equipment from a first user equipment, a measurement configuration for an antenna panel of the second user equipment; generating a first measurement report at the second user equipment based on the measurement configuration; receiving, at the second user equipment from a network, data intended for the first user equipment; and sending, from the second user equipment to the first user equipment, the data intended for the first user equipment.

A fourth aspect provides a method for wireless communications, comprising: receiving, at a network from a first user equipment, a request for a measurement configuration; sending, from the network to the first user equipment, a measurement configuration; and receiving, at the network from the first user equipment, a first measurement report comprising a remote antenna panel measurement report.

A fifth aspect provides a method for wireless communications, comprising: receiving, at a network from a first user equipment, a request for a measurement configuration for a remote antenna panel; and sending, from the network to the first user equipment, a measurement configuration for the remote antenna panel.

A sixth aspect provides a method for wireless communication, comprising: receiving, at a network from a second user equipment, a first measurement report, wherein the first measurement report is for an antenna panel at the second user equipment; and sending, from the network to the second user equipment, data intended for a first user equipment.

Other aspects provide: an apparatus operable, configured, or otherwise adapted to perform the aforementioned methods as well as those described elsewhere herein; non-transitory, computer-readable media comprising instructions that, when executed by one or more processors of a processing system, cause the processing system to perform the aforementioned methods as well as those described elsewhere herein; a computer program product embodied on a computer readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE FIGURES

The appended figures depict certain features of the various aspects described herein and are not to be considered limiting of the scope of this disclosure.

DETAILED DESCRIPTION

Figure 1:
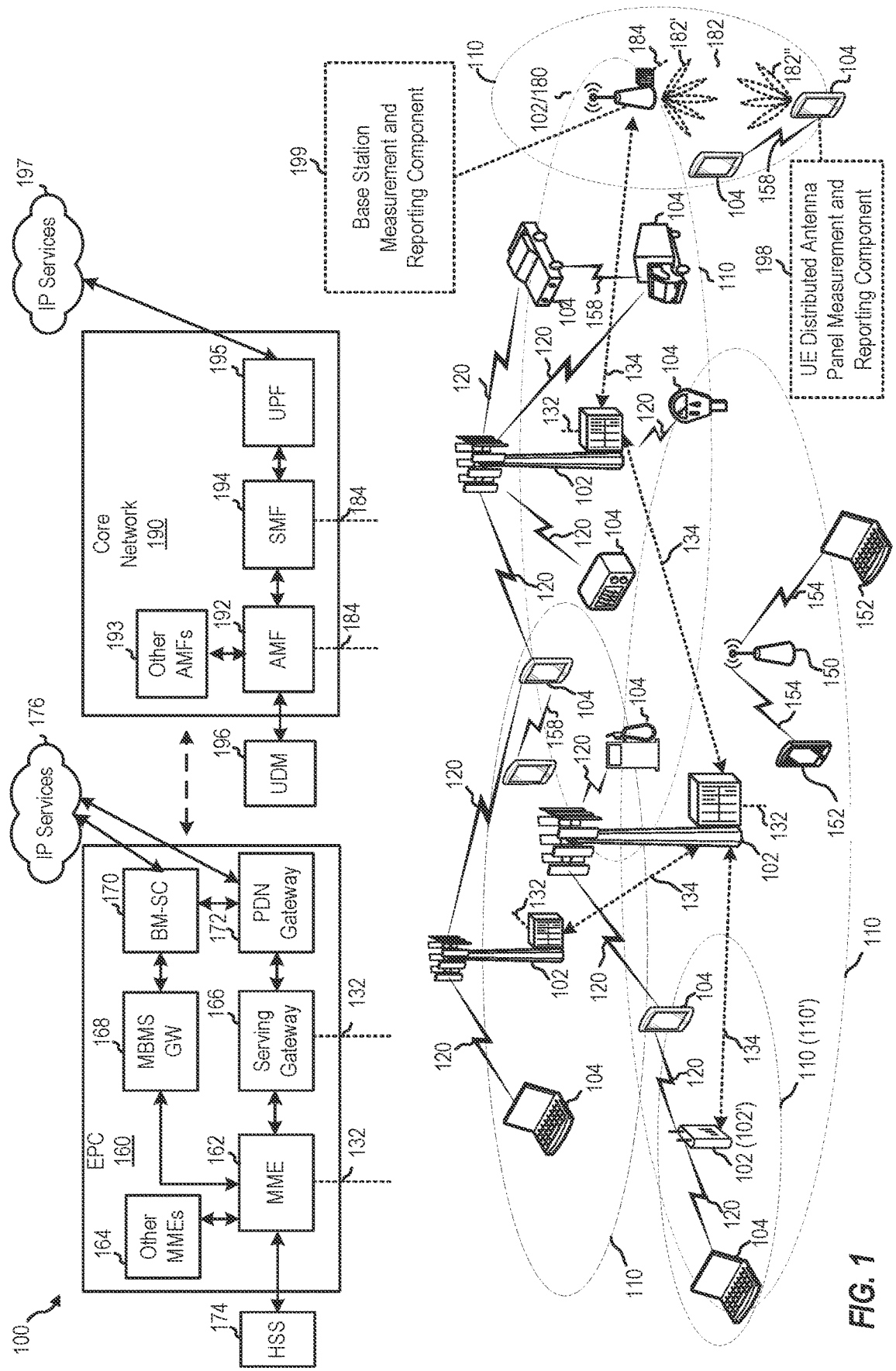
FIG. 1 is a block diagram conceptually illustrating an example wireless communication network.

Aspects of the present disclosure provide apparatuses and methods for performing distributed antenna panel measurement and reporting.

In order to provide connectivity regardless of the rotational direction of a wireless device, modern wireless devices may include multiple antenna panels arranged in different directions to transmit and receive signals from those different directions.

An antenna panel may include multiple antenna elements, and the design and layout of the antenna elements may be based (at least in part) on the frequency of the signals meant to be transmitted from and received by the antenna elements. Generally, as the frequency of a wireless carrier increases, the size of antenna elements, as well as their mutual distances, may be reduced. A benefit of antenna panels with a large number of smaller antenna elements is that the direction of transmitting and/or receiving beams can be adjusted by separately adjusting the phase of signals applied to each antenna element in such antenna panels. This beamforming may be particularly relevant to high-frequency wireless communications, such as those used for millimeter wave communications in 5G wireless communication systems (e.g., 5G NR).

Despite the capabilities of a wireless device with multiple antenna panels, it is not uncommon for one or more of the wireless device's antenna panels to be blocked during use. For example, when a wireless device, such as a smartphone, is placed in a user's pocket, the user's body may block or otherwise significantly attenuate wireless signals transmitted and/or received by the wireless device's antenna panels. Consequently, the wireless device may not be able to participate in various wireless communications tasks, including wireless channel measurement and reporting (e.g., between the wireless device and a network providing data services to the wireless device), sometimes referred to as channel sounding.

However, the advent of device-to-device (D2D) communications capabilities in wireless devices means that a first wireless device suffering a blockage, as in the example above of a smartphone in a user's pocket, may "borrow" an antenna panel from a second wireless device that is in independent data communication with the first wireless device. This borrowed antenna panel, which may be referred to as a "distributed" or "remote" antenna panel, may be used as a relay for transmitting and/or receiving wireless signals, thereby mitigating the blockage of the first wireless device's antenna panel. Thus, the transmission and reception range and reliability of the first wireless device may be improved by use of the distributed panel, which also improves power efficiency, processing efficiency, battery life, and other performance metrics related to wireless communications.

Thus, returning to the example above, a user's smartphone experiencing a blockage based on proximity to the user's body may use a distributed antenna panel from another wireless device, such as an antenna panel of a vehicle's telecommunication system in which the user is riding, to transmit to and/or received data from a network. For example, the user's smartphone may perform channel measurement and reporting using the distributed antenna panel.

Further, even when a first wireless device is not experiencing a blockage or other signal degradation, the first wireless device may want to leverage a higher performance distributed antenna panel in the second wireless device (such as a larger antenna panel) to improve data transmission and/or reception performance. This, in-turn, may likewise improve transmission and reception range and reliability, power efficiency, processing efficiency, battery life, and other performance metrics related to wireless communications.

The connection between the first and second wireless devices may be implemented using, for example, a wireless connection, such as a sidelink connection or a Wi-Fi connection, or a wired connection, such as through a multimedia interface with a vehicle.

Thus, sharing antenna panels between wireless devices enables not only more reliable wireless data communications, but also higher performance wireless data communications in various applications. Beneficially, sharing antenna panels between wireless devices can be transparent to a network serving the wireless devices. Thus, a wireless devices may report to the network various measurements related to received wireless signals (e.g., a reference signal received power (RSRP), signal to interference plus noise ratio (SINR), received signal strength indicator (RSSI), pre-coding matrix indicator (PMI), channel quality indicator (CQI), and rank indicator (RI)) for its own antenna panels (e.g., local panels) as well as remote antenna panels without the need to reconfigure the network.

As described in more detail below, sharing antenna panels to implement distributed antenna panel measurement and reporting may be implemented in various ways. For example, the reception, distribution, and implementation of measurement configurations (e.g., from a network) by wireless devices may be determined based on current conditions for each wireless device, and in particular, each antenna panel of each wireless device. Various demonstrative configurations and methods are described below with respect to FIGS. 4-14.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes base station measurement and reporting component 199, which may be used to configure and perform wireless channel measurement and reporting (e.g., sounding) with UEs. Wireless network 100 further includes UE distributed antenna panel component 198, which may be used by UEs 104 to coordinate sharing of distributed antenna panels, such as between two UEs 104 connected via a wired or wireless data connection (e.g., a sidelink connection 158). In various aspects described herein, UE distributed antenna panel component 198 may be used to perform wireless channel measurement and reporting with distributed antenna panels (e.g., antenna panels in two or more UEs 104).

Figure 2:
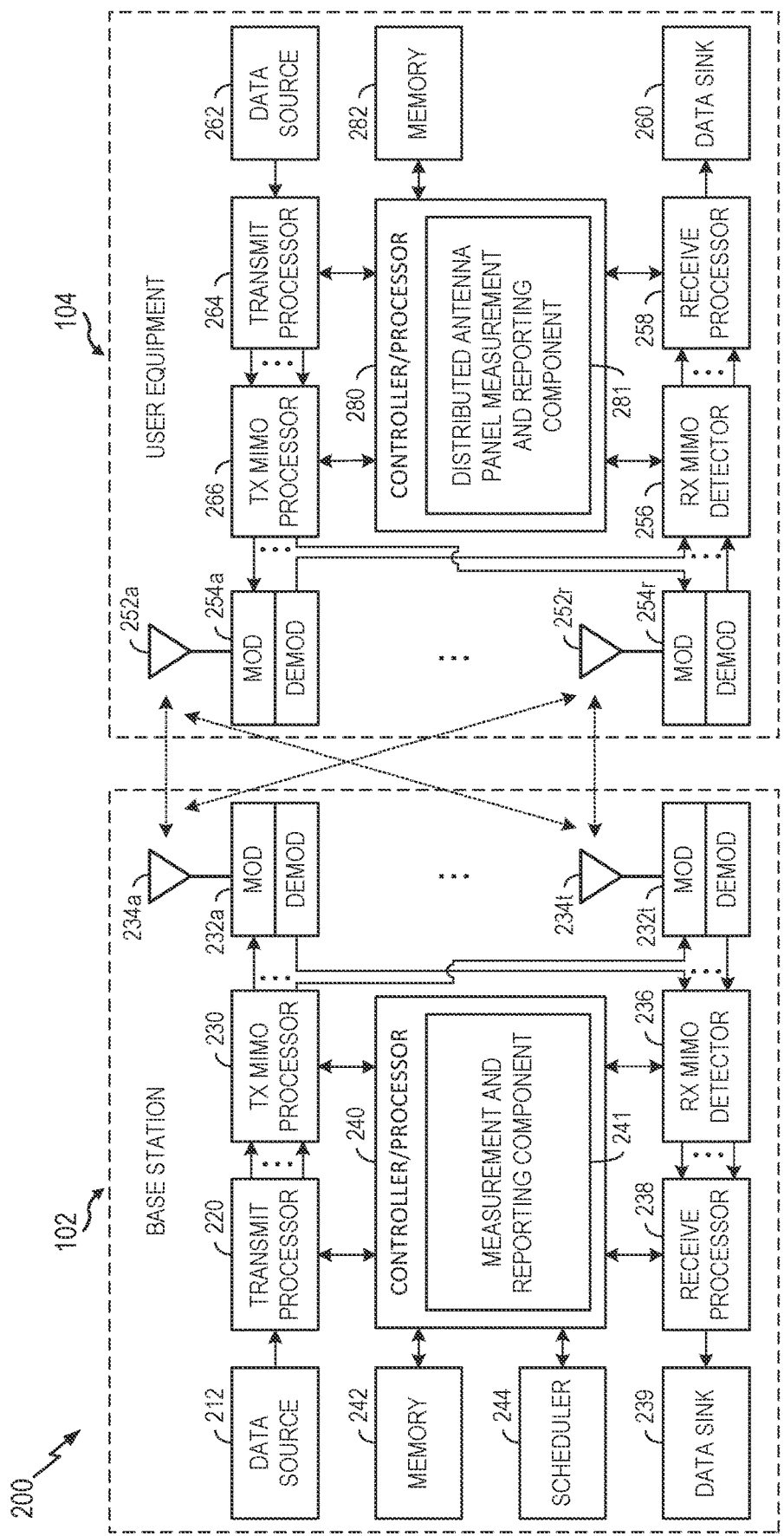
FIG. 2 is a block diagram conceptually illustrating aspects of an example a base station and user equipment.

FIG. 2 depicts aspects of a base station (BS) 102 and a user equipment (UE) 104.

Generally, BS 102 includes various processors (e.g., 220, 230, 238, and 240), antennas 234a-t, transceivers 232a-t, and other aspects, which are involved in transmission of data (e.g., source data 212) and reception of data (e.g., data sink 239). For example, BS 102 may send and receive data between itself and UE 104. BS 102 includes controller/processor 240, which comprises measurement and reporting component 241. Measurement and reporting component 241 may be configured to implement base station measurement and reporting component 199 of FIG. 1.

Generally, UE 104 includes various processors (e.g., 258, 264, 266, and 280), antennas 252a-r, transceivers 254a-r, and other aspects, involved in transmission of data (e.g., source data 262) and reception of data (e.g., data sink 260). UE 104 includes controller/processor 280, which comprises distributed antenna panel component 281. Distributed antenna panel component 281 may be configured to implement user equipment distributed antenna panel component 198 of FIG. 1.

Figure 3:
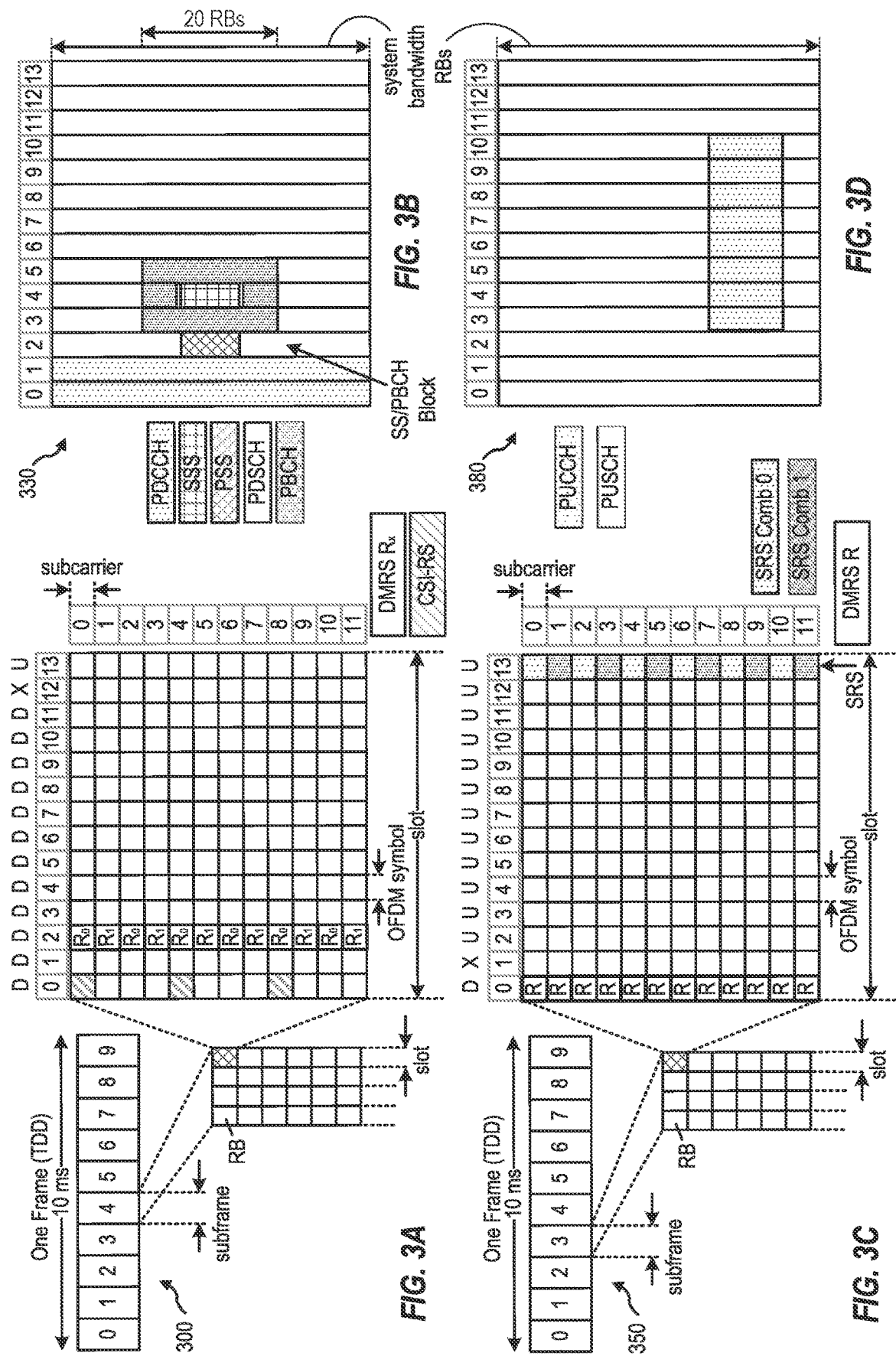
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Further, as described herein, UEs 104 may use distributed antenna panels to overcome path loss and range reductions inherent to higher frequency wireless data carriers, such as mmWave signals, as well as to improve bandwidth, throughput, and other characteristics of mmWave wireless data communications.

Aspects Related to Distributed Antenna Panel Measurement and Reporting

Figure 4:
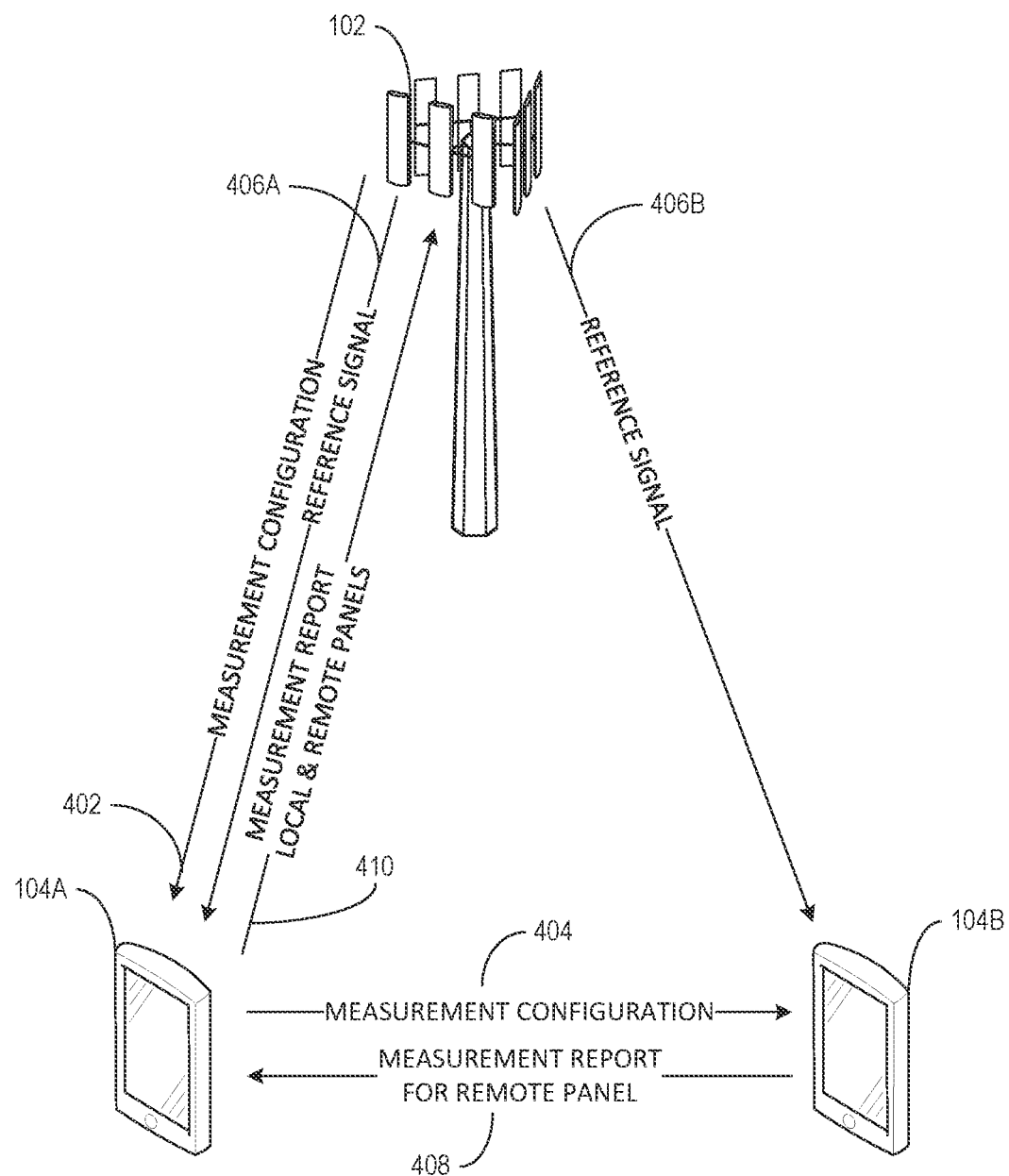
FIG. 4 depicts an example of distributed antenna panel measurement and reporting.

FIG. 4 depicts an example of distributed antenna panel measurement and reporting.

In particular, a first user equipment 104A (a wireless device) may be configured to measure a downlink reference signal (e.g., a channel state information reference signal (CSI-RS) or a synchronization signal block (SSB)) by base station 102, which may be a part of a wireless communication network, such as described with respect to FIG. 1. For example, base station 102 may send a measurement configuration 402 to first user equipment 104A, which configures first user equipment 104A to receive and report a measurement of at last one reference signal. For example, the measurement configuration may configure downlink reference signal resources as well as uplink reporting resources.

Generally, a configured reference signal (e.g., a CSI-RS) can be used to derive information about the properties of the channel over which the reference signal is transmitted, including to estimate the interference level by subtracting the expected received signal from what is actually received via the reference signal.

Base station 102 can further configure user equipment 104A with one or more reference signal resource sets (e.g., CSI-RS resource sets), where each such reference signal resource set includes one or more configured reference signals (e.g., CSI-RSs). In some cases, a reference signal resource set may be a part of report configurations from base station 102 that configures measurements and corresponding reporting to be performed by user equipment 104A.

As described above, first user equipment 104A may want to use a remote antenna panel in second user equipment 104B, which is in data communication with first user equipment 104A. For example, first user equipment 104A may want to increase its transmission and/or reception data rate or it may want to improve its transmission and/or reception reliability by configuring multiple antenna panels at once. Accordingly, first user equipment 104A may send a measurement configuration 404 to second user equipment 104B to measure a reference signal, including on or more of the reference signals configured for first user equipment 104A by base station 102. In some examples, first user equipment 104A sends measurement configuration 404 via a wired or wireless data connection (e.g., a sidelink or Wi-Fi data connection).

First user equipment 104A may then perform measurements of configured reference signals, such as reference signal 406A, at one or more of its local antenna panels. Similarly, second user equipment 104B performs measurements of reference signals configured by first user equipment 104A, such as reference signal 406B, at one or more of its local antenna panels (which are remote panels from the perspective of first user equipment 104A).

In this example, second user equipment 104B sends a measurement report 408 to first user equipment 104A after performing the measurements. The measurement report may include various types of measurements, such as a reference signal received power (RSRP), a signal to interference plus noise ratio (SINR), a received signal strength indicator (RSSI), a pre-coding matrix indicator (PMI), a channel quality indicator (CQI), and rank indicator (RI), to name a few examples. In some cases, the measurement report may be for beam management, time/frequency tracking, or channel state information (CSI) derivation, such as for rank and precoder determination for a MIMO channel.

First user equipment 104A may then send a measurement report 410, including measurements of reference signals for local antenna panels (e.g., at user equipment 104A) and remote antenna panels (e.g., at user equipment 104B). Base station 102 may then use the measurement report 410 to configure further data communications with first user equipment 104A by way of the antenna panels distributed between first user equipment 104A and second user equipment 104B.

Because antenna panels at both first user equipment 104A and second user equipment 104B are measuring reference signals on behalf of first user equipment 104A, first user equipment 104A may be said to be performing distributed antenna panel measurement and reporting.

Though not depicted, first user equipment 104A and second user equipment 104B may exchange antenna panel information. For example, when establishing their data connection (e.g., a sidelink data connection), first user equipment 104A and second user equipment 104B may exchange antenna panel information (e.g., number of panels, characteristics of the panels, and other information) as part of a capability enquiry or report. In other cases, first user equipment 104A may assume that second user equipment 104B has at least one antenna panel to perform wireless communications and thus send a configuration for that primary antenna panel.

Figure 5:
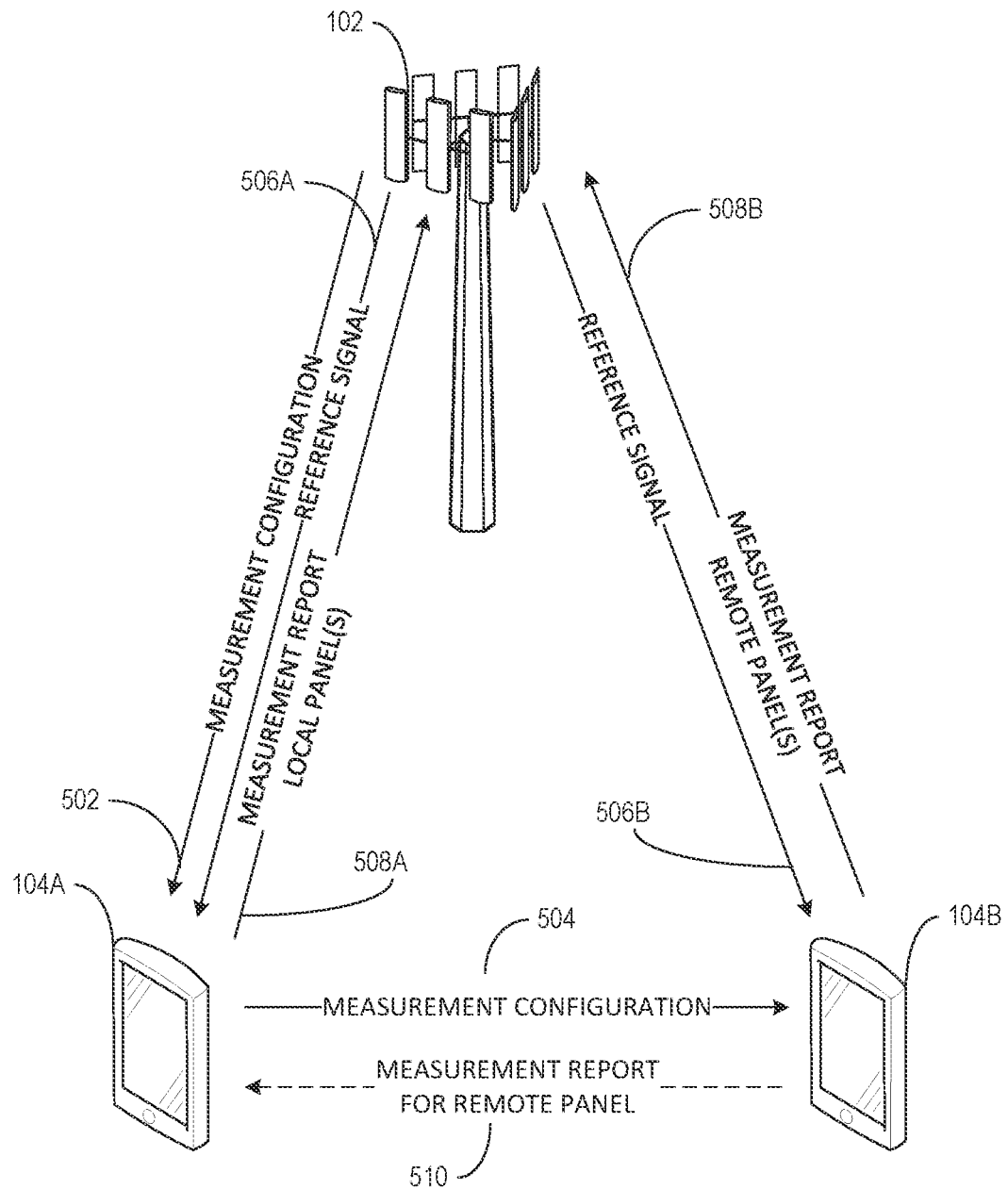
FIG. 5 depicts another example of distributed antenna panel measurement and reporting.

FIG. 5 depicts another example of distributed antenna panel measurement and reporting.

In this example, first user equipment 104A may be configured to measure a downlink reference signal by base station 102, as in FIG. 4, but first user equipment 104A may further request a separate measurement configuration from base station 102 for a distributed antenna panel, such as a remote antenna panel at second user equipment 104B. Accordingly, base station 102 may send a measurement configuration 502 to first user equipment 104A for both first user equipment 104A's local panel(s) and separately for first user equipment 104A's remote panel(s) (e.g., antenna panels local to second user equipment 104B). In some cases, the separate measurement configuration for first user equipment 104A's remote panel(s) may configure reference signals having a different time, frequency, and/or layer configuration as compared to that of the measurement configuration for first user equipment 104A's local panel(s).

First user equipment 104A may thus send a measurement configuration 504 to second user equipment 104B to measure one or more reference signals and to report the measurements directly to base station 102. As above, first user equipment 104A may send measurement configuration 504 to second user equipment 104B via a wired or wireless data connection (e.g., a sidelink or Wi-Fi data connection).

First user equipment 104A and second user equipment 104B may then perform measurements of configured reference signals, such as reference signal 506A and 506B, respectively. As above, the measurements may include RSRP, SINR, RSSI, PMI, CQI, and RI, among others. After performing the configured measurements, first user equipment 104A and second user equipment 104B then send measurement reports 508A and 508B, respectively, to base station 102.

In some examples, second user equipment 104B may further send measurement report 510 to first user equipment 104A after performing the measurements. First user equipment 104A may use measurement report 510 to trigger a state change. For example, first user equipment 104A may autonomously change a downlink and/or uplink spatial filter for data transmission based on the measurement report (e.g., reported signal strength).

Here again, first user equipment 104A and second user equipment 104B may exchange antenna panel information prior to performing the distributed antenna panel measurement and reporting.

Figure 6:
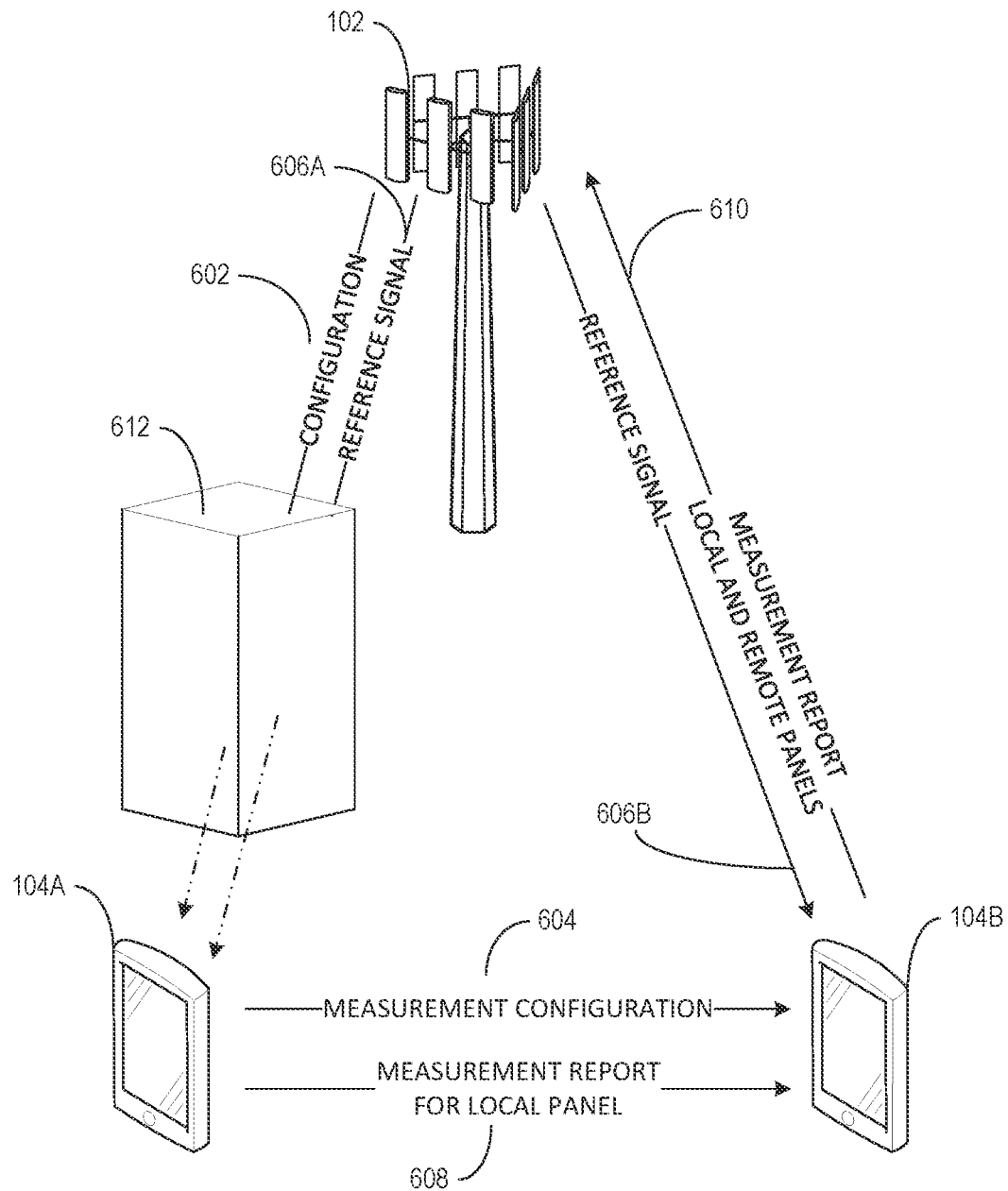
FIG. 6 depicts yet another example of distributed antenna panel measurement and reporting.

FIG. 6 depicts yet another example of distributed antenna panel measurement and reporting.

In this example, first user equipment 104A may again be configured to measure a downlink reference signal by base station 102, as in FIGS. 4 and 5. However, in this example, an impediment 612 is causing signal degradation between base station 102 and first user equipment 104A. Accordingly, first user equipment 104A may request a separate measurement configuration from base station 102 for a distributed antenna panel, such as a remote antenna panel at second user equipment 104B.

Accordingly, base station 102 sends a measurement configuration 602 to first user equipment 104A for both first user equipment 104A's local panel(s) and separately for first user equipment 104A's remote panel(s) (e.g., antenna panels local to second user equipment 104B). As above, the separate measurement configuration for first user equipment 104A's remote panel(s) may configure reference signals having a different time, frequency, and/or layer configuration as compared to that of the measurement configuration for first user equipment 104A's local panel(s).

First user equipment 104A then sends a measurement configuration 604 to second user equipment 104B to measure one or more reference signals and to report the measurements directly to base station 102. As above, first user equipment 104A may send measurement configuration 604 to second user equipment 104B via a wired or wireless data connection (e.g., a sidelink or Wi-Fi data connection).

First user equipment 104A and second user equipment 104B may then perform measurements of configured reference signals, such as reference signal 606A and 606B, respectively. As above, the measurements may include RSRP, SINR, RSSI, PMI, CQI, and RI, among others.

After performing the configured measurements, first user equipment 104A sends a measurement report 608 regarding its local panels to second user equipment 104B. Second user equipment 104B then sends a measurement report 610 to base station 102, which includes the measurement reports for first user equipment 104A's local and remote panels. Thus, second user equipment 104B is used as a relay to avoid impediment 612.

Here again, first user equipment 104A and second user equipment 104B may exchange antenna panel information prior to performing the distributed antenna panel measurement and reporting.

After the antenna panel measurement is completed as described in FIGS. 4-6, first user equipment 104A may use an antenna panel of second user equipment 104B for sending and receiving data to base station 102. As above, first user equipment 104A may use the remote antenna panel in second user equipment 104B in addition to, or as an alternative to, its own local antenna panel(s).

Notably, while FIGS. 4-6 depict just two user equipments (104A and 104B) and a single base station for simplicity, the same concepts may be applied to any number of user equipments and base stations. For example, first user equipment 104A may send measurement configurations and receive measurement reports from more than one other user equipment.

Figure 7:
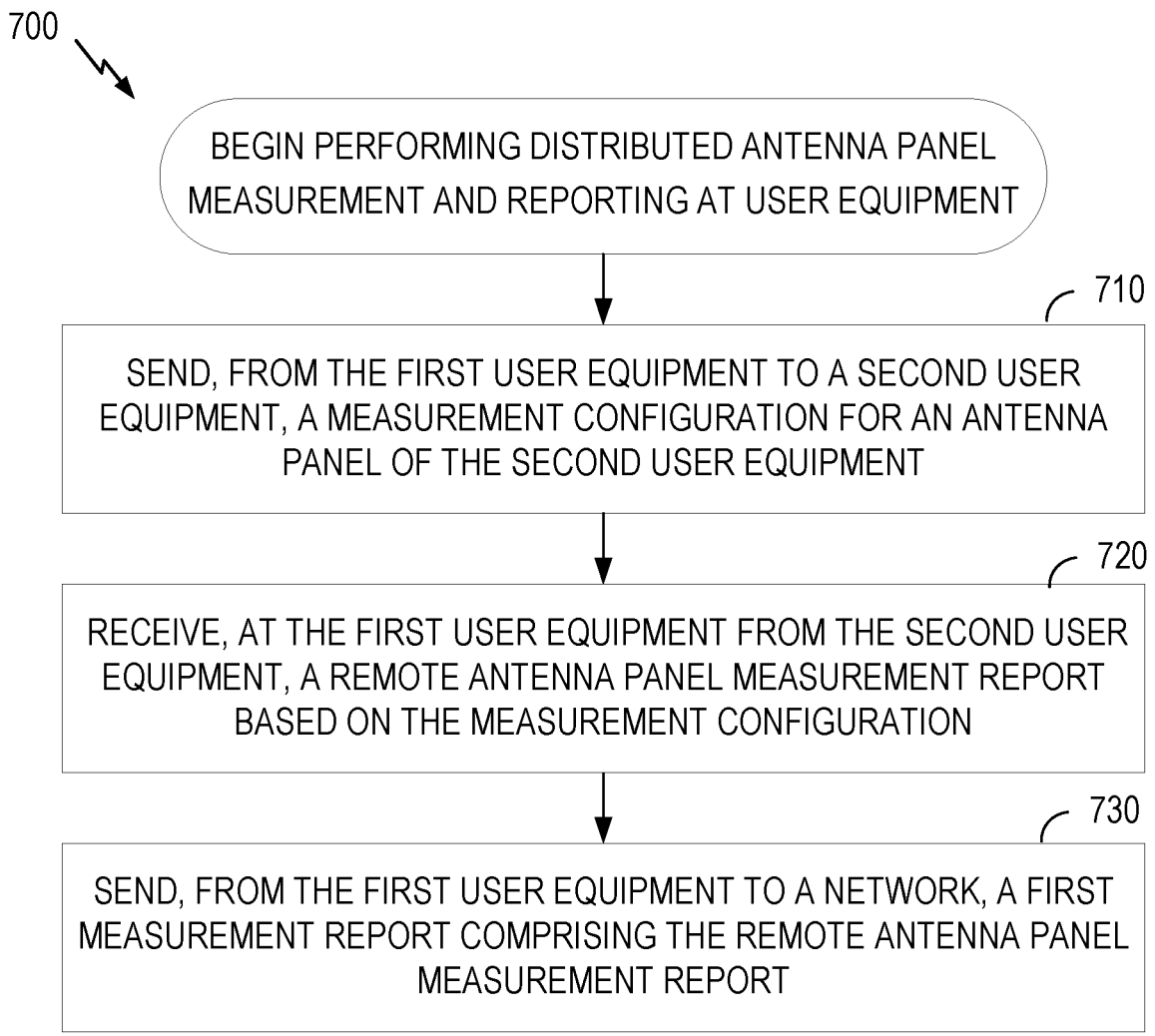
FIG. 7 depicts an example method for performing distributed antenna panel measurement and reporting at a user equipment.

Aspects Related to Methods for Distributed Antenna Panel Measurement and Reporting FIG. 7 depicts an example method 700 for performing distributed antenna panel measurement and reporting at a user equipment.

In some cases, a user equipment (e.g., UE 104 in the wireless communication network 100 of FIG. 1), or a portion thereof, may perform, or be configured, operable, or adapted to perform, operations of method 700. In some cases, operations of method 700 may be implemented as software components (e.g., distributed antenna panel component 281 of FIG. 2) that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

Method 700 begins at step 710 with sending, from a first user equipment to a second user equipment, a measurement configuration for an antenna panel of the second user equipment.

The measurement configuration may take different forms. For example, the measurement configuration may include one or more of: a measurement resource configuration; a measurement reporting resource configuration; an indication of a beamformed channel; or one or more metrics for measurement.

The indication of the beamformed channel may take different form. For In one example, the indication of the beamformed channel includes a transmission configuration indication (TCI). In other examples, the indication of the beamformed channel may additionally or alternatively include other spatial relationship information, which, for example, may be used to indicate an uplink transmission beam for a sounding reference signal (SRS), a CSI-RS, a synchronization signal block (SSB), or a SRS ID.

The one or more metrics for measurement may comprise one or more of a reference signal received power (RSRP), signal to interference plus noise ratio (SINR), received signal strength indicator (RSSI), pre-coding matrix indicator (PMI), channel quality indicator (CQI), or rank indicator (RI).

Sending the measurement configuration in step 710 can be performed in different ways. In one example, the sending comprises sending the measurement configuration on one of a sidelink or a Wi-Fi connection between the first user equipment and the second user equipment. In another example, the sending comprises sending the measurement configuration on a wired connection. The preceding examples are illustrative and not meant to limit the scope of the sending in step 710, and the sending can be performed in other ways.

Method 700 then proceeds to step 720 with receiving, at the first user equipment from the second user equipment, a remote antenna panel measurement report based on the measurement configuration.

Method 700 then proceeds to step 730 with sending, from the first user equipment to a network, a first measurement report comprising the remote antenna panel measurement report.

In some cases, the first measurement report may also include a local antenna panel measurement report for an antenna panel of the first user equipment, such as in the example of FIG. 4. In such cases, the first user equipment may be performing synchronous reporting of remote antenna panels and local antenna panels.

In some cases, method 700 may be performed along with additional steps not depicted in FIG. 7.

In some cases, method 700 may include sending, from the first user equipment to the network, a second measurement report comprising a local antenna panel for an antenna panel of the first user equipment. In such cases, the first user equipment may be performing asynchronous reporting of remote antenna panels and local antenna panels.

The first and/or second measurement reports may take different forms. For example, either or both reports may comprise a channel-state-information reference signal (CSI-RS) report.

In some cases, method 700 may include receiving, at the first user equipment from the network, a first measurement reporting resource configuration; and sending, from the first user equipment to the network, a request for a second measurement reporting resource configuration. In such cases, the second measurement report comprising the local antenna panel measurement report may be sent from the first user equipment to the network according to the second measurement reporting resource.

In some cases, method 700 may include receiving, at the first user equipment from the second user equipment, an antenna panel configuration report. The antenna panel configuration report may provide, for example, a number of antenna panels at the second user equipment, characteristics of the panels at the second user equipment, and the like.

FIG. 7 depicts one example of a method consistent with the disclosure herein, but other examples are possible, which may include additional or alternative steps, or which omit certain steps. The various examples discussed with respect to FIG. 7 are illustrative and not meant to limit the scope of method 700.

Figure 8:
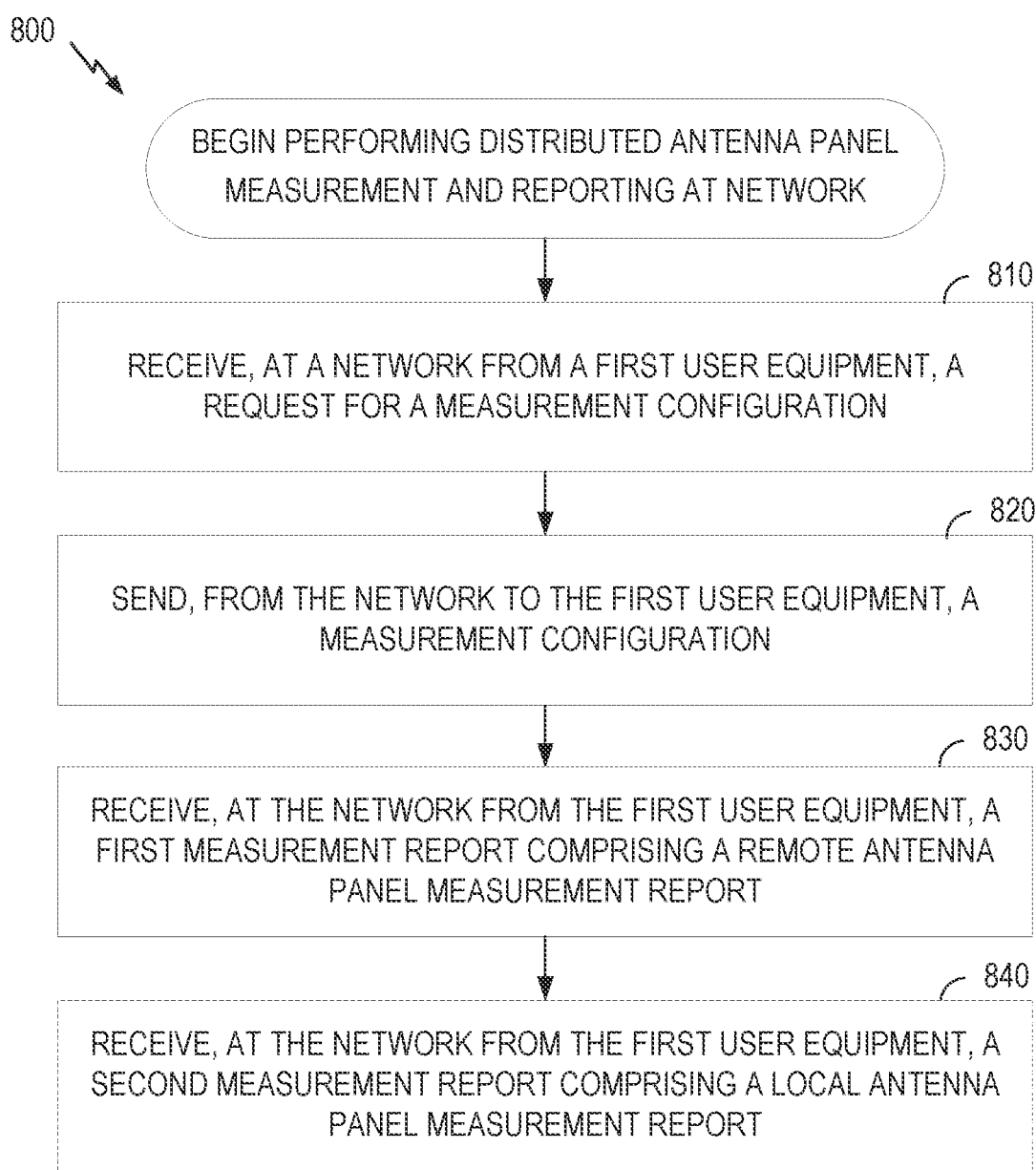
FIG. 8 depicts an example method for performing distributed antenna panel measurement and reporting at a network.

FIG. 8 depicts an example method 800 for performing distributed antenna panel measurement and reporting at a network. Generally, method 800 may be the network compliment to method 700 of FIG. 7, which is performed at a user equipment.

In some cases, a base station (e.g., such as base station 102 in the wireless communication network 100 of FIG. 1), or a portion thereof, may perform, or be configured, operable, or adapted to perform, operations of method 800. In some cases, operations of method 800 may be implemented as software components (e.g., measurement and reporting component 241 of FIG. 2) that are executed and run on one or more processors (e.g., controller/processor 240 of FIG. 2). Signals involved in the operations may be transmitted or received by the base station by one or more antennas (e.g., antennas 234 of FIG. 2), or via a bus interface of one or more processors (e.g., the controller/processor 240) obtaining and/or outputting the signals.

Method 800 begins at step 810 with receiving, at a network from a first user equipment, a request for a measurement configuration (e.g., as discussed with respect to FIGS. 4-6).

Method 800 then proceeds to step 820 with sending, from the network to the first user equipment, a measurement configuration.

The measurement configuration may take different forms. For example, the measurement configuration may include one or more of: a measurement resource configuration; a measurement reporting resource configuration; an indication of a beamformed channel; or one or more metrics for measurement.

The indication of the beamformed channel may take different form. For In one example, the indication of the beamformed channel includes a transmission configuration indication (TCI). In other examples, the indication of the beamformed channel may additionally or alternatively include other spatial relationship information, which, for example, may be used to indicate an uplink transmission beam for a sounding reference signal (SRS), a CSI-RS, a synchronization signal block (SSB), or a SRS ID.

The one or more metrics for measurement may include one or more of a reference signal received power (RSRP), signal to interference plus noise ratio (SINR), received signal strength indicator (RSSI), pre-coding matrix indicator (PMI), channel quality indicator (CQI), or rank indicator (RI).

Method 800 then proceeds to step 830 with receiving, at the network from the first user equipment, a first measurement report comprising the remote antenna panel measurement report, wherein the remote antenna panel management report is for an antenna panel of a second user equipment. In some cases, the first measurement report further comprises a local antenna panel measurement report for an antenna panel of the first user equipment, such as when the first user equipment is synchronously reporting measurements from local and remote panels.

However, when the first user equipment is asynchronously reporting measurements for local and remote panels, method 800 may then optionally proceed to step 840 with receiving, at the network from the first user equipment, a second measurement report comprising a local antenna measurement report, wherein the local antenna panel measurement report is for an antenna panel of the first user equipment. For example, where the user equipment reports the measurements of its local panels and the remote panels of the second user equipment asynchronously, step 840 may be used.

The first and/or second measurement report may include various types of information. In one case, the first and/or second measurement reports comprise a channel-state-information reference signal (CSI-RS) report.

FIG. 8 depicts one example of a method consistent with the disclosure herein, but other examples are possible, which may include additional or alternative steps, or which omit certain steps.

Figure 9:
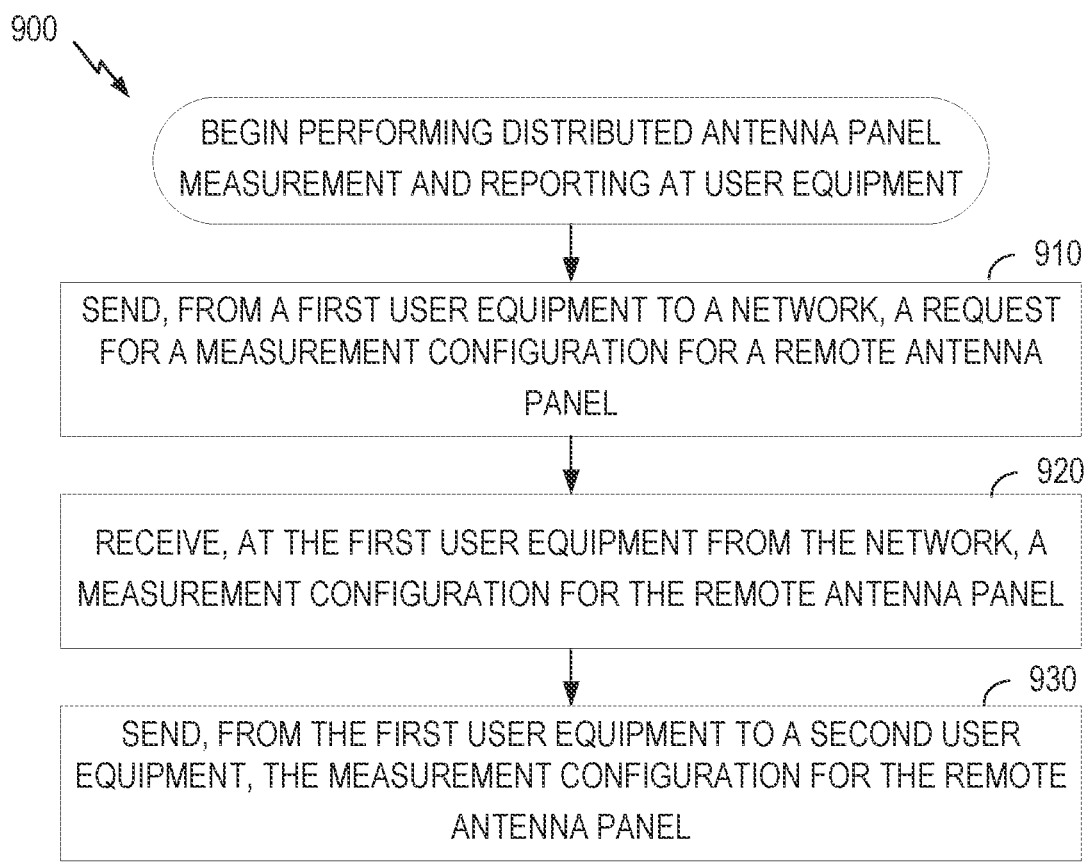
FIG. 9 depicts another example method for performing distributed antenna panel measurement and reporting at a user equipment.

FIG. 9 depicts another example method 900 for performing distributed antenna panel measurement and reporting at a user equipment.

In some cases, a user equipment (e.g., UE 104 in the wireless communication network 100 of FIG. 1), or a portion thereof, may perform, or be configured, operable, or adapted to perform, operations of method 900. In some cases, operations of method 900 may be implemented as software components (e.g., distributed antenna panel component 281 of FIG. 2) that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

Method 900 begins at step 910 with sending, from a first user equipment to a network, a request for a measurement configuration for a remote antenna panel.

Method 900 then proceeds to step 920 with receiving, at the first user equipment from the network, a measurement configuration for the remote antenna panel.

Method 900 then proceeds to step 930 with sending, from the first user equipment to a second user equipment, the measurement configuration for the remote antenna panel, wherein the second user equipment comprises the remote antenna panel.

The measurement configuration may take different forms. For example, the measurement configuration may include one or more of: a measurement resource configuration; a measurement reporting resource configuration; an indication of a beamformed channel; or one or more metrics for measurement.

The indication of the beamformed channel may take different form. For In one example, the indication of the beamformed channel includes a transmission configuration indication (TCI). In other examples, the indication of the beamformed channel may additionally or alternatively include other spatial relationship information, which, for example, may be used to indicate an uplink transmission beam for a sounding reference signal (SRS), a CSI-RS, a synchronization signal block (SSB), or a SRS ID.

The one or more metrics for measurement may comprise one or more of a reference signal received power (RSRP), signal to interference plus noise ratio (SINR), received signal strength indicator (RSSI), pre-coding matrix indicator (PMI), channel quality indicator (CQI), or rank indicator (RI).

Sending the measurement configuration in step 930 can be performed in different ways. In one example, the sending comprises sending the measurement configuration on one of a sidelink or a Wi-Fi connection between the first user equipment and the second user equipment. In another example, the sending comprises sending the measurement configuration on a wired connection. The preceding examples are illustrative and not meant to limit the scope of the sending in step 930, and the sending can be performed in other ways.

In some cases, method 900 may be performed along with additional steps not depicted in FIG. 9.

In some cases, method 900 may include receiving, at the first user equipment from the network, a measurement configuration for a local antenna panel of the first user equipment.

In some cases, method 900 may include generating a measurement report at the first user equipment based on the measurement configuration for the local antenna panel of the first user equipment; and sending, from the first user equipment to the network, the measurement report.

In some cases, method 900 may include receiving, at the first user equipment from the network, a measurement configuration for a local antenna panel of the first user equipment; generating a measurement report at the first user equipment based on the measurement configuration for the local antenna panel of the first user equipment; and sending, from the first user equipment to the second user equipment, the measurement report.

Measurement reports may take different forms. For example, a measurement report may comprise a channel-state-information reference signal (CSI-RS) report.

In some cases, method 900 may include receiving, at the first user equipment from the second user equipment, an antenna panel configuration report. The antenna panel configuration report may provide, for example, a number of antenna panels at the second user equipment, characteristics of the panels at the second user equipment, and the like.

FIG. 9 depicts one example of a method consistent with the disclosure herein, but other examples are possible, which may include additional or alternative steps, or which omit certain steps. The various examples discussed with respect to FIG. 9 are illustrative and not meant to limit the scope of method 900.

Figure 10:
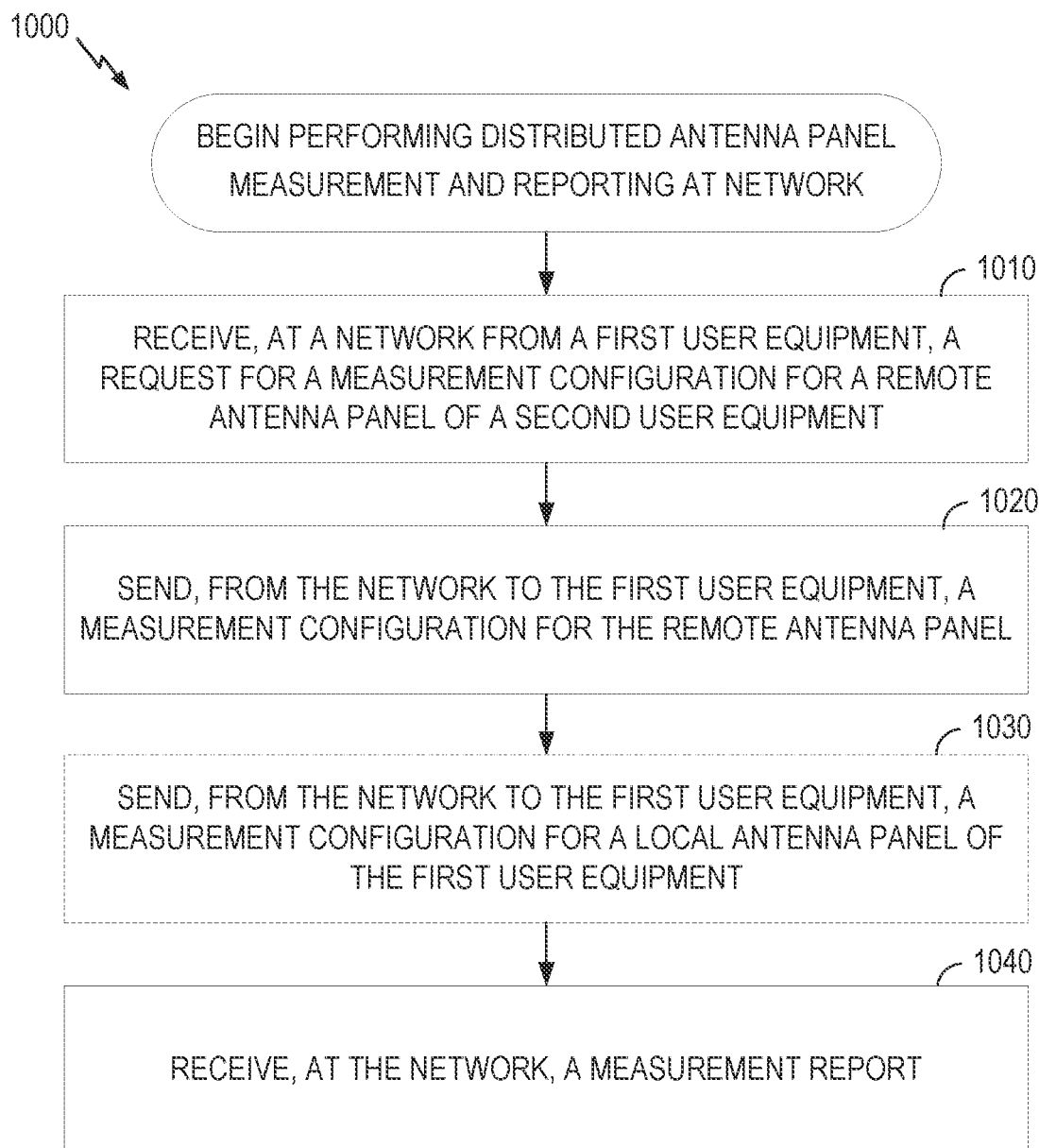
FIG. 10 depicts another example method for performing distributed antenna panel measurement and reporting at a network.

FIG. 10 depicts an example method 1000 for performing distributed antenna panel measurement and reporting at a network. Generally, method 1000 may be the network compliment to method 900 of FIG. 9, which is performed at a user equipment.

In some cases, a base station (e.g., such as base station 102 in the wireless communication network 100 of FIG. 1), or a portion thereof, may perform, or be configured, operable, or adapted to perform, operations of method 1000. In some cases, operations of method 1000 may be implemented as software components (e.g., measurement and reporting component 241 of FIG. 2) that are executed and run on one or more processors (e.g., controller/processor 240 of FIG. 2). Signals involved in the operations may be transmitted or received by the base station by one or more antennas (e.g., antennas 234 of FIG. 2), or via a bus interface of one or more processors (e.g., the controller/processor 240) obtaining and/or outputting the signals.

Method 1000 begins at step 1010 with receiving, at a network from a first user equipment, a request for a measurement configuration for a remote antenna panel at a second user equipment.

Method 1000 then proceeds to step 1020 with sending, from the network to the first user equipment, a measurement configuration for the remote antenna panel.

Method 1000 may optionally proceed to step 1030 with sending, from the network to the first user equipment, a measurement configuration for a local antenna panel of the first user equipment.

The measurement configurations for the remote and local panels may take different forms. For example, the measurement configuration may include one or more of: a measurement resource configuration; a measurement reporting resource configuration; an indication of a beamformed channel; or one or more metrics for measurement. Further, the measurement configurations for the remote antenna panel and the local panel may differ in at least one of a time, a frequency, or a layer configuration.

The indication of the beamformed channel may take different form. For In one example, the indication of the beamformed channel includes a transmission configuration indication (TCI). In other examples, the indication of the beamformed channel may additionally or alternatively include other spatial relationship information, which, for example, may be used to indicate an uplink transmission beam for a sounding reference signal (SRS), a CSI-RS, a synchronization signal block (SSB), or a SRS ID.

The one or more metrics for measurement may include one or more of a reference signal received power (RSRP), signal to interference plus noise ratio (SINR), received signal strength indicator (RSSI), pre-coding matrix indicator (PMI), channel quality indicator (CQI), or rank indicator (RI).

Method 1000 then proceeds to step 1040 with receiving, at the network, a measurement report. The measurement report may include information regarding the remote antenna panel of the second user equipment. In some cases, the measurement report may also include information regarding the local panel of the first user equipment. In some cases, the network receives the measurement report from the second user equipment acting as a relay for the first user equipment. In other cases, the network may receive the measurement report from the first user equipment.

Measurement reports may take different forms. In one example, a measurement report comprises a channel-state-information reference signal (CSI-RS) report.

FIG. 10 depicts one example of a method consistent with the disclosure herein, but other examples are possible, which may include additional or alternative steps, or which omit certain steps. The various examples discussed with respect to FIG. 10 are illustrative and not meant to limit the scope of method 1000.

Figure 11:
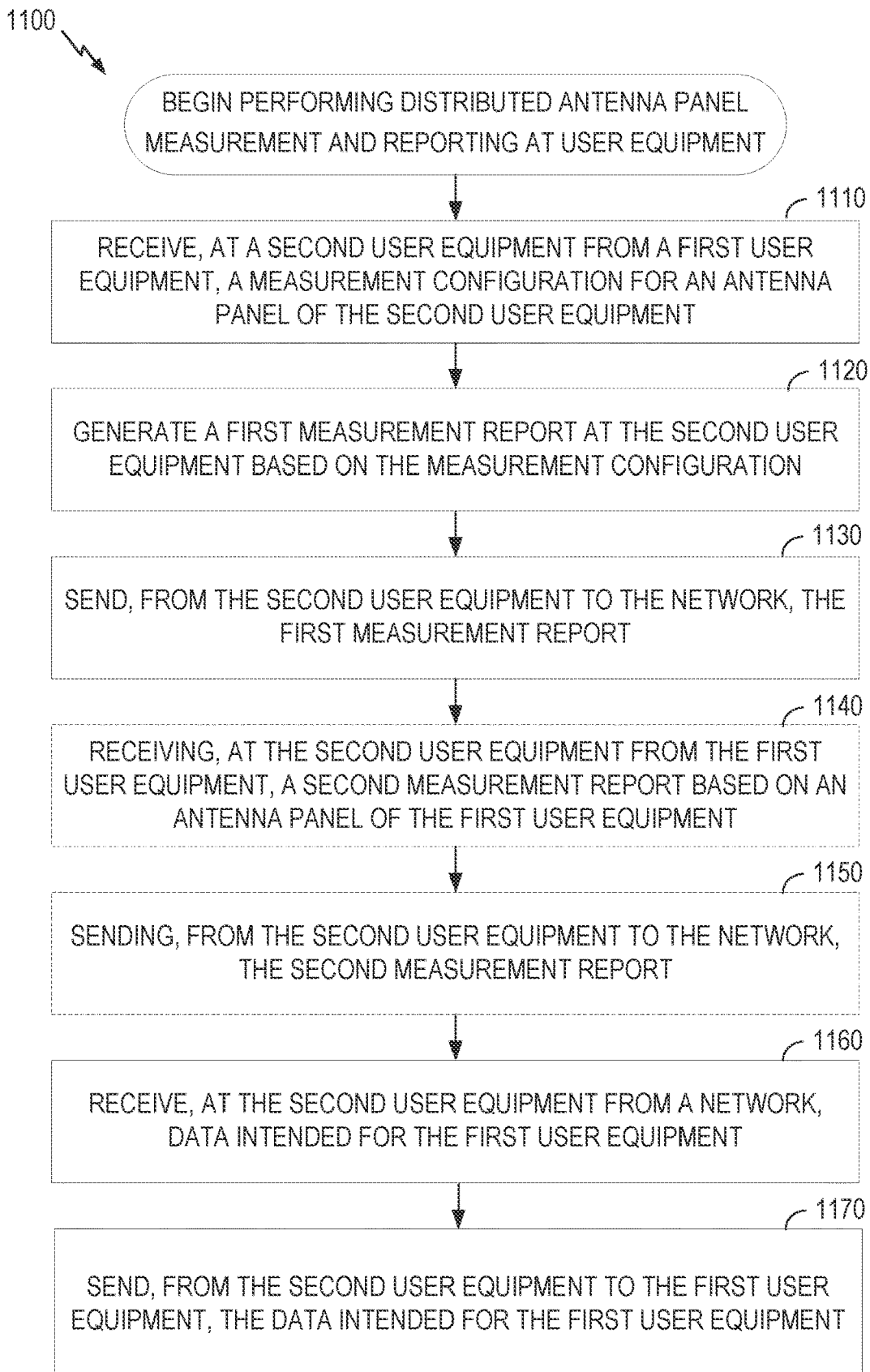
FIG. 11 depicts another example method for performing distributed antenna panel measurement and reporting at a user equipment.

FIG. 11 depicts another example method 1100 for performing distributed antenna panel measurement and reporting at a user equipment.

In some cases, a user equipment (e.g., UE 104 in the wireless communication network 100 of FIG. 1), or a portion thereof, may perform, or be configured, operable, or adapted to perform, operations of method 1100. In some cases, operations of method 1100 may be implemented as software components (e.g., distributed antenna panel component 281 of FIG. 2) that are executed and run on one or more processors (e.g., controller/processor 280 of FIG. 2). Signals involved in the operations may be transmitted or received by the UE by one or more antennas (e.g., antennas 252 of FIG. 2), or via a bus interface of one or more processors (e.g., the controller/processor 280) obtaining and/or outputting the signals.

Method 1100 begins at step 1110 with receiving, at a second user equipment from a first user equipment, a measurement configuration for an antenna panel of the second user equipment.

The measurement configuration may take different forms. For example, the measurement configuration may include one or more of: a measurement resource configuration; a measurement reporting resource configuration; an indication of a beamformed channel; or one or more metrics for measurement.

The indication of the beamformed channel may take different form. For In one example, the indication of the beamformed channel includes a transmission configuration indication (TCI). In other examples, the indication of the beamformed channel may additionally or alternatively include other spatial relationship information, which, for example, may be used to indicate an uplink transmission beam for a sounding reference signal (SRS), a CSI-RS, a synchronization signal block (SSB), or a SRS ID.

The one or more metrics for measurement may comprise one or more of a reference signal received power (RSRP), signal to interference plus noise ratio (SINR), received signal strength indicator (RSSI), pre-coding matrix indicator (PMI), channel quality indicator (CQI), or rank indicator (RI).

Receiving the measurement configuration in step 1110 can be performed in different ways. In one example, receiving, at the second user equipment from the first user equipment, a measurement configuration for an antenna panel of the second user equipment comprises receiving the measurement configuration on one of a sidelink connection or a Wi-Fi connection between the second user equipment and the first user equipment. In another example, receiving, at the second user equipment from the first user equipment, a measurement configuration for an antenna panel of the second user equipment comprises receiving the measurement configuration on a wired connection.

Method 1100 then proceeds to step 1120 with generating a first measurement report at the second user equipment based on the measurement configuration.

Method 1100 then proceeds to step 1130 with sending, from the second user equipment to the network, the first measurement report. In other examples, the second user equipment may instead send the first measurement report to the first user equipment.

Method 1100 may optionally proceed to step 1140 with receiving, at the second user equipment from the first user equipment, a second measurement report based on an antenna panel of the first user equipment.

When step 1140 is performed, Method 1100 may further optionally proceed to step 1150 with sending, from the second user equipment to the network, the second measurement report.

Method 1100 then proceeds to step 1160 with receiving, at the second user equipment from a network, data intended for the first user equipment.

Method 1100 then proceeds to step 1170 with sending, from the second user equipment to the first user equipment, the data intended for the first user equipment.

In some cases, method 1100 may be performed along with additional steps not depicted in FIG. 11.

In some cases, method 1100 may include sending, from the second user equipment to the first user equipment, an antenna panel configuration report. The antenna panel configuration report may provide, for example, a number of antenna panels at the second user equipment, characteristics of the panels at the second user equipment, and the like.

FIG. 11 depicts one example of a method consistent with the disclosure herein, but other examples are possible, which may include additional or alternative steps, or which omit certain steps. The various examples discussed with respect to FIG. 7 are illustrative and not meant to limit the scope of method 1100.

Figure 12:
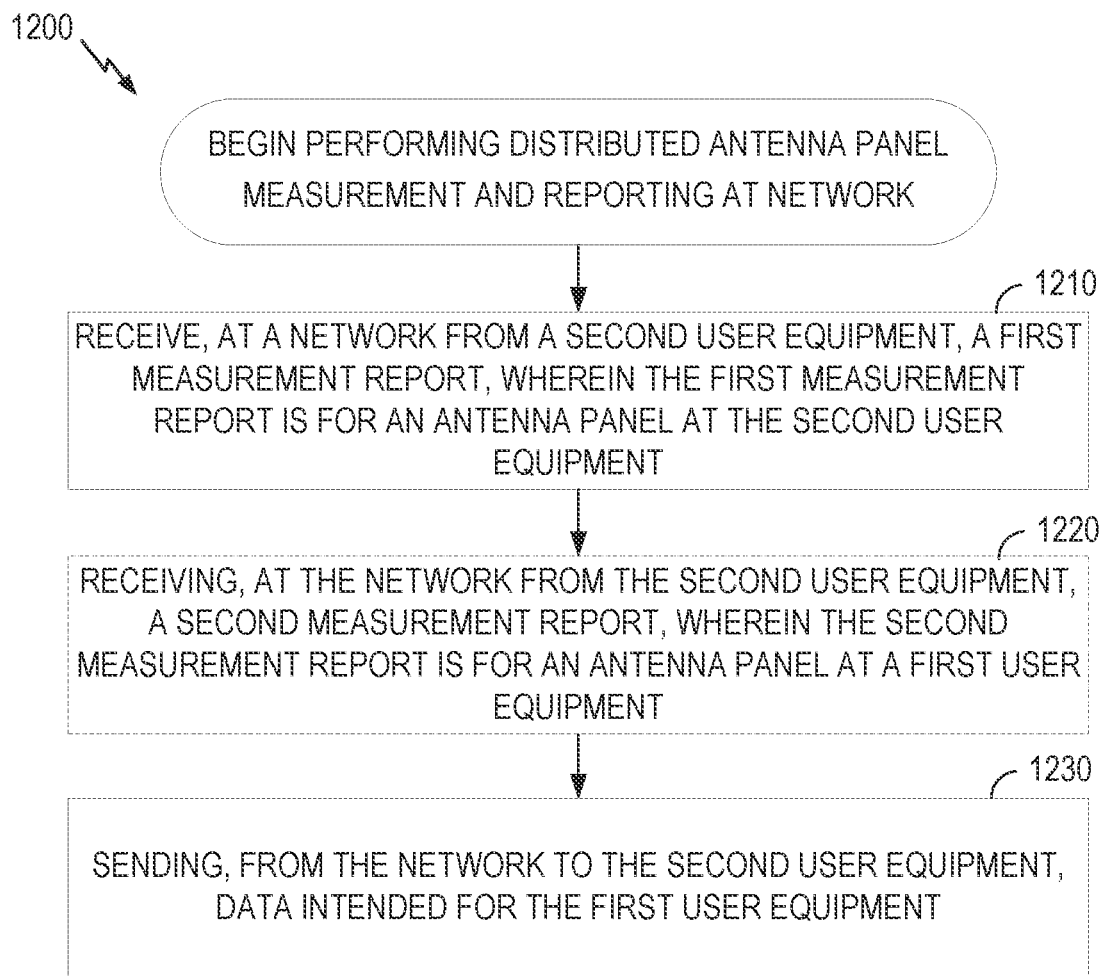
FIG. 12 depicts another example method for performing distributed antenna panel measurement and reporting at a network.

FIG. 12 depicts an example method 1200 for performing distributed antenna panel measurement and reporting at a network. Generally, method 1200 may be the network compliment to method 1100 of FIG. 11, which is performed at a user equipment.

In some cases, a base station (e.g., such as base station 102 in the wireless communication network 100 of FIG. 1), or a portion thereof, may perform, or be configured, operable, or adapted to perform, operations of method 1200. In some cases, operations of method 1200 may be implemented as software components (e.g., measurement and reporting component 241 of FIG. 2) that are executed and run on one or more processors (e.g., controller/processor 240 of FIG. 2). Signals involved in the operations may be transmitted or received by the base station by one or more antennas (e.g., antennas 234 of FIG. 2), or via a bus interface of one or more processors (e.g., the controller/processor 240) obtaining and/or outputting the signals.

Method 1200 begins at step 1210 with receiving, at a network from a second user equipment, a first measurement report, wherein the first measurement report is for an antenna panel at the second user equipment.

Method 1200 then optionally proceeds to step 1220 with receiving, at the network from the second user equipment, a second measurement report, wherein the second measurement report is for an antenna panel at a first user equipment.

Method 1200 then proceeds to step 1230 with sending, from the network to the second user equipment, data intended for the first user equipment.

FIG. 12 depicts one example of a method consistent with the disclosure herein, but other examples are possible, which may include additional or alternative steps, or which omit certain steps. The various examples discussed with respect to FIG. 12 are illustrative and not meant to limit the scope of method 1200.

Notably, while FIGS. 7-12 describe various operations between two user equipments and a network, the same concepts may be applied to any number of user equipments.

Example Wireless Communication Devices

Figure 13:
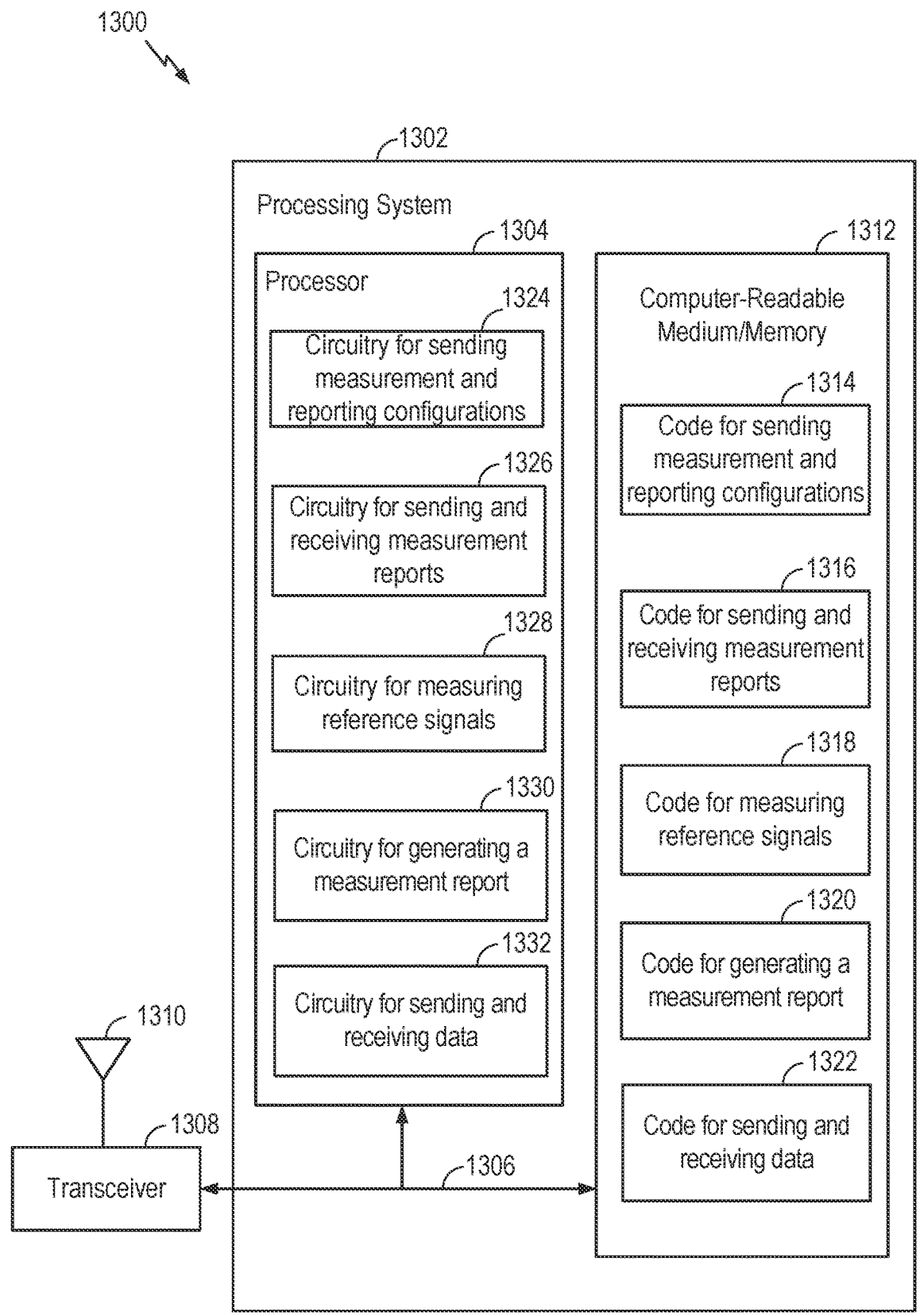
FIG. 13 depicts an example communications device, or part thereof.

FIG. 13 depicts an example communications device 1300 that includes various components operable, configured, or adapted to perform operations for the techniques disclosed herein, such as the operations depicted and described with respect to FIGS. 7, 9, and 11. In some examples, communication device 1300 may be a UE 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes a processor 1304 coupled to a computer-readable medium/memory 1312 via a bus 1306. In certain aspects, computer-readable medium/memory 1312 is configured to store instructions (e.g., computer-executable code) that when executed by processor 1304, cause processor 1304 to perform the operations illustrated in FIGS. 7, 9, and 11, or other operations for performing the various techniques discussed herein for distributed antenna panel measurement and reporting.

In the depicted example, computer-readable medium/memory 1312 stores code 1314 for sending measurement configurations, code 1316 for sending and receiving measurement reports, code 1318 for measuring reference signals, code 1320 for generating a measurement report, and code 1322 for sending and receiving data.

In the depicted example, processor 1304 has circuitry configured to implement the code stored in the computer-readable medium/memory 1312. For example, processor 1304 includes circuitry 1324 for sending measurement configurations, circuitry 1326 for sending and receiving measurement reports, circuitry 1328 for measuring reference signals, circuitry 1330 for generating a measurement report, and circuitry 1332 for sending and receiving data.

Various components of communications device 1300 may provide means for performing the methods described herein, including with respect to FIGS. 7, 9, and 11.

In some examples, means for transmitting or sending (or means for outputting for transmission) may include the transceivers 254 and/or antenna(s) 252 of the UE 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the UE 104 illustrated in FIG. 2 and/or transceiver 1308 and antenna 1310 of the communication device 1300 in FIG. 13.

In some examples, means for generating, means for measuring, means for determining, means for taking action, and means for coordinating may include a processing system, which may include one or more processors, such as the receive processor 258, the transmit processor 264, the TX MIMO processor 266, and/or the controller/processor 280, including distributed antenna panel measurement and reporting component 281, of the UE 104 illustrated in FIG. 2 and/or the processing system 1302 of the communication device 1300 in FIG. 13.

Notably, FIG. 13 is just use example, and many other examples and configurations of communication device 1300 are possible.

Figure 14:
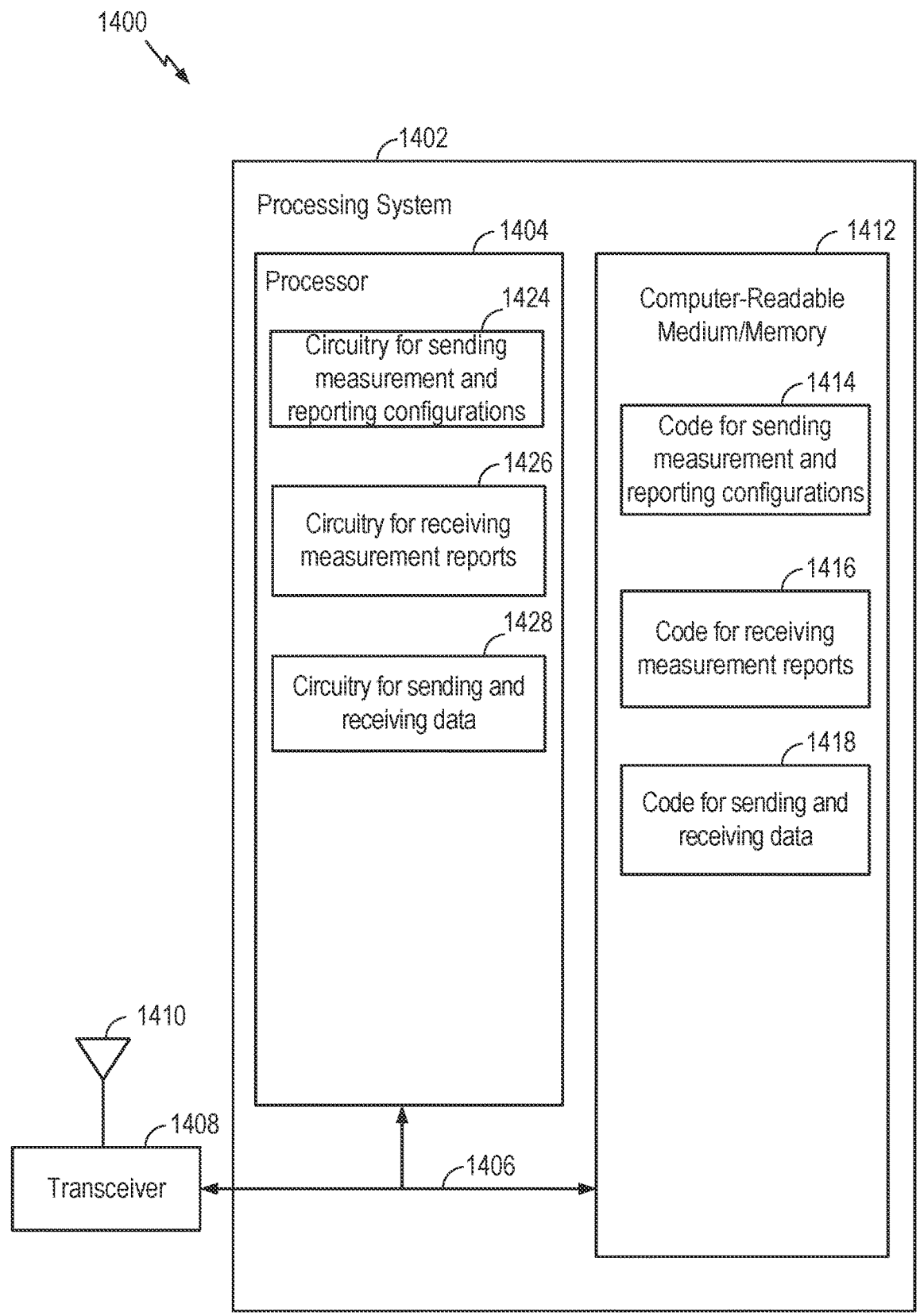
FIG. 14 depicts another example communications device, or part thereof.

FIG. 14 depicts another example communications device 1400 that includes various components operable, configured, or adapted to perform operations for the techniques disclosed herein, such as the operations depicted and described with respect to FIGS. 8, 10, and 12. In some examples, communication device 1400 may be a base station 102 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes a processor 1404 coupled to a computer-readable medium/memory 1412 via a bus 1406. In certain aspects, computer-readable medium/memory 1412 is configured to store instructions (e.g., computer-executable code) that when executed by processor 1404, cause processor 1404 to perform the operations illustrated in FIGS. 8, 10, and 12, or other operations for performing the various techniques discussed herein for distributed antenna panel measurement and reporting.

In the depicted example, computer-readable medium/memory 1412 stores code 1414 for sending measurement configurations, code 1416 for receiving measurement reports, and code 1418 for sending and receiving data.

In the depicted example, processor 1404 has circuitry configured to implement the code stored in the computer-readable medium/memory 1412. For example, processor 1404 includes circuitry 1424 for sending measurement configurations, circuitry 1426 for receiving measurement reports, and circuitry 1428 for sending and receiving data.

Various components of communications device 1400 may provide means for performing the methods described herein, including with respect to FIGS. 8, 10, and 12.

In some examples, means for transmitting or sending (or means for outputting for transmission) may include the transceivers 232 and/or antenna(s) 234 of the base station 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the base station 102 illustrated in FIG. 2 and/or transceiver 1408 and antenna 1410 of the communication device 1400 in FIG. 14.

In some examples, means for generating, means for measuring, means for determining, means for taking action, and means for coordinating may include a processing system, which may include one or more processors, such as the receive processor 238, the transmit processor 220, the TX MIMO processor 230, and/or the controller/processor 240, including measurement and reporting component 241, of the base station 102 illustrated in FIG. 2 and/or the processing system 1402 of the communication device 1400 in FIG. 14.

Notably, FIG. 14 is just use example, and many other examples and configurations of communication device 1400 are possible.

Example Clauses

Implementation examples are described in the following numbered clauses:

Clause 1: A method for wireless communications, comprising: sending, from a first user equipment to a second user equipment, a measurement configuration for an antenna panel of the second user equipment; receiving, at the first user equipment from the second user equipment, a remote antenna panel measurement report based on the measurement configuration; and sending, from the first user equipment to a network, a first measurement report comprising the remote antenna panel measurement report.

Clause 2: The method of Clause 1, wherein: the first measurement report further comprises a local antenna panel measurement report, and the local antenna panel measurement report is for an antenna panel of the first user equipment.

Clause 3: The method of Clause 1, further comprising: sending, from the first user equipment to the network, a second measurement report comprising a local antenna panel measurement report, wherein the local antenna panel measurement report is for an antenna panel of the first user equipment.

Clause 4: The method of Clause 3, further comprising: receiving, at the first user equipment from the network, a first measurement reporting resource configuration; and sending, from the first user equipment to the network, a request for a second measurement reporting resource configuration, wherein the second measurement report comprising the local antenna panel measurement report is sent from the first user equipment to the network according to the second measurement reporting resource.

Clause 5: The method of any one of Clauses 1-4, wherein sending, from the first user equipment to the second user equipment, the measurement configuration comprises sending the measurement configuration on a sidelink connection between the first user equipment and the second user equipment.

Clause 6: The method of any one of Clauses 1-4, wherein sending, from the first user equipment to the second user equipment, the measurement configuration comprises sending the measurement configuration on a Wi-Fi connection between the first user equipment and the second user equipment.

Clause 7: The method of any one of Clauses 1-6, wherein the measurement configuration comprises: a measurement resource configuration; a measurement reporting resource configuration; an indication of a beamformed channel; and one or more metrics for measurement.

Clause 8: The method of Clause 7, wherein the one or more metrics for measurement comprises one or more of a reference signal received power (RSRP), signal to interference plus noise ratio (SINR), received signal strength indicator (RSSI), pre-coding matrix indicator (PMI), channel quality indicator (CQI), and rank indicator (RI).

Clause 9: The method of any one of Clauses 1-8, wherein the first measurement report comprises a channel-state-information reference signal (CSI-RS) report.

Clause 10: The method of any one of Clauses 1-9, further comprising receiving, at the first user equipment from the second user equipment, an antenna panel configuration report.

Clause 11: A method for wireless communications, comprising: sending, from a first user equipment to a network, a request for a measurement configuration for a remote antenna panel; receiving, at the first user equipment from the network, a measurement configuration for the remote antenna panel; and sending, from the first user equipment to a second user equipment, the measurement configuration for the remote antenna panel, wherein the second user equipment comprises the remote antenna panel.

Clause 12: The method of Clause 11, further comprising: receiving, at the first user equipment from the network, a measurement configuration for a local antenna panel of the first user equipment; generating a measurement report at the first user equipment based on the measurement configuration for the local antenna panel of the first user equipment; and sending, from the first user equipment to the network, the measurement report.

Clause 13: The method of Clause 11, further comprising: receiving, at the first user equipment from the network, a measurement configuration for a local antenna panel of the first user equipment; generating a measurement report at the first user equipment based on the measurement configuration for the local antenna panel of the first user equipment; and sending, from the first user equipment to the second user equipment, the measurement report.

Clause 14: The method of any one of Clauses 11-13, further comprising receiving, at the first user equipment from the second user equipment, a remote antenna panel measurement report based on the measurement configuration for the remote antenna panel.

Clause 15: The method of any one of Clauses 12-14, wherein the measurement configuration for the remote antenna panel is different in at least one of a time, a frequency, or a layer configuration as compared to the measurement configuration for the local antenna panel.

Clause 16: The method of any one of Clauses 11-15, wherein sending, from the first user equipment to the second user equipment, the measurement configuration for the remote antenna panel comprises sending the measurement configuration on a sidelink connection between the first user equipment and the second user equipment.

Clause 17: The method of any one of Clauses 11-16, wherein sending, from the first user equipment to the second user equipment, the measurement configuration for the remote antenna panel comprises sending the measurement configuration on a Wi-Fi connection between the first user equipment and the second user equipment.

Clause 18: The method of any one of Clauses 11-17, wherein the measurement configuration for the remote antenna panel comprises: a measurement resource configuration; an indication of a beamformed channel; and one or more metrics for measurement.

Clause 19: The method of Clause 18, wherein the one or more metrics for measurement comprises one or more of a reference signal received power (RSRP), signal to interference plus noise ratio (SINR), received signal strength indicator (RSSI), pre-coding matrix indicator (PMI), channel quality indicator (CQI), and rank indicator (RI).

Clause 20: The method of any one of Clauses 12-19, wherein the measurement report comprises a channel-state-information reference signal (CSI-RS) report.

Clause 21: The method of any one of Clauses 11-20, further comprising receiving, at the first user equipment from the second user equipment, an antenna panel configuration report.

Clause 22: A method for wireless communication, comprising receiving, at a second user equipment from a first user equipment, a measurement configuration for an antenna panel of the second user equipment; generating a first measurement report at the second user equipment based on the measurement configuration; receiving, at the second user equipment from a network, data intended for the first user equipment; and sending, from the second user equipment to the first user equipment, the data intended for the first user equipment.

Clause 23: The method of Clause 22, further comprising sending, from the second user equipment to the first user equipment, the first measurement report.

Clause 24: The method of Clause 22, further comprising sending, from the second user equipment to the network, the first measurement report.

Clause 25: The method of Clause 24, further comprising: receiving, at the second user equipment from the first user equipment, a second measurement report based on an antenna panel of the first user equipment; and sending, from the second user equipment to the network, the second measurement report.

Clause 26: The method of any one of Clauses 22-25, wherein the measurement configuration comprises: a measurement resource configuration; a measurement reporting resource configuration; an indication of a beamformed channel; and one or more metrics for measurement.

Clause 27: The method of any one of Clauses 22-26, wherein receiving, at the second user equipment from the first user equipment, the measurement configuration for the antenna panel of the second user equipment comprises receiving the measurement configuration on a sidelink connection between the second user equipment and the first user equipment.

Clause 28: The method of any one of Clauses 22-27, wherein receiving, at the second user equipment from the first user equipment, the measurement configuration for the antenna panel of the second user equipment comprises receiving the measurement configuration on a Wi-Fi connection between the second user equipment and the first user equipment.

Clause 29: The method of any one of Clauses 22-28, further comprising sending, from the second user equipment to the first user equipment, an antenna panel configuration report.

Clause 30: A method for wireless communications, comprising: receiving, at a network from a first user equipment, a request for a measurement configuration; sending, from the network to the first user equipment, a measurement configuration; and receiving, at the network from the first user equipment, a first measurement report comprising a remote antenna panel measurement report.

Clause 31: The method of Clause 30, wherein: the first measurement report further comprises a local antenna panel measurement report, and the local antenna panel measurement report is for an antenna panel of the first user equipment.

Clause 32: The method of any one of Clauses 30-31, further comprising: receiving, at the network from the first user equipment, a second measurement report comprising a local antenna panel measurement report, wherein the local antenna panel measurement report is for an antenna panel of the first user equipment.

Clause 33: The method of Clause 32, further comprising: sending, from the network to the first user equipment, a first measurement reporting resource configuration; and receiving, at the network from the first user equipment, a request for a second measurement reporting resource configuration, wherein the second measurement report comprising the remote antenna panel measurement report is transmitted from the first user equipment to the network according to the second measurement reporting resource.

Clause 34: The method of any one of Clauses 30-34, wherein the measurement configuration comprises: a measurement resource configuration; a measurement reporting resource configuration; an indication of a beamformed channel; and one or more metrics for measurement.

Clause 35: The method of Clause 34, wherein the one or more metrics for measurement comprises one or more of a reference signal received power (RSRP), signal to interference plus noise ratio (SINR), received signal strength indicator (RSSI), pre-coding matrix indicator (PMI), channel quality indicator (CQI), and rank indicator (RI).

Clause 36: The method of any one of Clauses 30-35, wherein the first measurement report comprises a channel-state-information reference signal (CSI-RS) report.

Clause 37: A method for wireless communications, comprising: receiving, at a network from a first user equipment, a request for a measurement configuration for a remote antenna panel; and sending, from the network to the first user equipment, a measurement configuration for the remote antenna panel.

Clause 38: The method of Clause 37, further comprising: sending, from the network to the first user equipment, a measurement configuration for a local antenna panel of the first user equipment; and receiving, at the network from the first user equipment, the measurement report, wherein the measurement report includes measurements for the local antenna panel of the first user equipment and the remote antenna panel of a second user equipment.

Clause 39: The method of any one of Clauses 37-38, wherein the measurement configuration for the remote antenna panel is different in at least one of a time, a frequency, or a layer configuration as compared to the measurement configuration for the local antenna panel.

Clause 40: The method of any one of Clauses 37-39, wherein the measurement configuration for the remote antenna panel comprises: a measurement resource configuration; an indication of a beamformed channel; and one or more metrics for measurement.

Clause 41: The method of Clause 40, wherein the one or more metrics for measurement comprises one or more of a reference signal received power (RSRP), signal to interference plus noise ratio (SINR), received signal strength indicator (RSSI), pre-coding matrix indicator (PMI), channel quality indicator (CQI), and rank indicator (RI).

Clause 42: The method of any one of Clauses 37-41, wherein the measurement report comprises a channel-state-information reference signal (CSI-RS) report.

Clause 43: A method for wireless communication, comprising: receiving, at a network from a second user equipment, a first measurement report, wherein the first measurement report is for an antenna panel at the second user equipment; and sending, from the network to the second user equipment, data intended for a first user equipment.

Clause 44: The method of Clause 43, further comprising receiving, at the network from the second user equipment, a second measurement report, wherein the second measurement report is for an antenna panel at the first user equipment.

Clause 45: A method for wireless communications, comprising: receiving, at a network from a user equipment, a request for a plurality of measurement configurations; sending, from the network to the user equipment, a plurality of measurement configuration, wherein each measurement configuration of the plurality of measurement configurations is associated with a separate reporting resource; and receiving, at the network, a plurality of measurement reports in accordance with the plurality of measurement configurations.

Clause 46: The method of Clause 45, wherein at least one of the measurement configurations is configured for the user equipment.

Clause 47: The method of any one of Clauses 45-46, wherein at least one of the measurement configurations is configured for another user equipment.

Clause 48: The method of any one of Clauses 45-47, wherein at least one of the measurement configurations is configured for an antenna panel remote from the user equipment.

Clause 49: The method of any one of Clauses 45-48, wherein at least one of the measurement configurations is configured for an antenna panel local to the user equipment.

Clause 50: The method of any one of Clauses 45-49, wherein the plurality of measurement reports are received by the network from the user equipment.

Clause 51: A processing system, comprising: a memory comprising computer-executable instructions; one or more processors configured to execute the computer-executable instructions and cause the processing system to perform a method in accordance with any one of Clauses 1-50.

Clause 52: A processing system, comprising means for performing a method in accordance with any one of Clauses 1-50.

Clause 53: A non-transitory computer-readable medium comprising computer-executable instructions that, when executed by one or more processors of a processing system, cause the processing system to perform a method in accordance with any one of Clauses 1-50.

Clause 54: A computer program product embodied on a computer-readable storage medium comprising code for performing a method in accordance with any one of Clauses 1-50.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 has a measurement and reporting component 241 that may be configured to provide measurement configurations and to receive measurement reports, according to aspects described herein. As shown in FIG. 2, the controller/processor 280 of the UE 104 has a distributed antenna panel measurement and reporting component 281 that may be configured to receive measurement configurations, to measure reference signals, and to send measurement reports, according to aspects described herein. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of distributed antenna panel measurement and reporting in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, and others), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

The invention claimed is:

1. A method for wireless communications, comprising:
sending, from a first user equipment to a second user equipment, a measurement configuration for an antenna panel of the second user equipment, wherein the measurement configuration comprises a configuration for receiving and measuring at least one downlink reference signal from a base station;
receiving, at the first user equipment from the second user equipment, a remote antenna panel measurement report based on the measurement configuration; and
sending, from the first user equipment to the base station, a first measurement report comprising the remote antenna panel measurement report.

2. The method of claim 1, wherein:
the first measurement report further comprises a local antenna panel measurement report, and the local antenna panel measurement report is for an antenna panel of the first user equipment.

3. The method of claim 1, further comprising:
sending, from the first user equipment to the base station, a second measurement report comprising a local antenna panel measurement report,
wherein the local antenna panel measurement report is for an antenna panel of the first user equipment.

4. The method of claim 3, further comprising:
receiving, at the first user equipment from the base station, a first measurement reporting resource configuration; and
sending, from the first user equipment to the base station, a request for a second measurement reporting resource configuration,
wherein the second measurement report comprising the local antenna panel measurement report is sent from the first user equipment to the base station according to the second measurement reporting resource.

5. The method of claim 1, wherein sending, from the first user equipment to the second user equipment, the measurement configuration comprises sending the measurement configuration on a sidelink connection between the first user equipment and the second user equipment.

6. The method of claim 1, wherein sending, from the first user equipment to the second user equipment, the measurement configuration comprises sending the measurement configuration on a Wi-Fi connection between the first user equipment and the second user equipment.

7. The method of claim 1, wherein the measurement configuration comprises:
a measurement resource configuration;
a measurement reporting resource configuration;
an indication of a beamformed channel; and
one or more metrics for measurement.

8. The method of claim 7, wherein the one or more metrics for measurement comprises one or more of a reference signal received power (RSRP), signal to interference plus noise ratio (SINR), received signal strength indicator (RSSI), pre-coding matrix indicator (PMI), channel quality indicator (CQI), and rank indicator (RI).

9. The method of claim 1, wherein the first measurement report comprises a channel-state-information reference signal (CSI-RS) report.

10. The method of claim 1, further comprising receiving, at the first user equipment from the second user equipment, an antenna panel configuration report.

11. An apparatus for wireless communications, comprising:
a memory comprising instructions;
one or more processors configured to execute the instructions and cause the apparatus to:
send to a user equipment a measurement configuration for an antenna panel of the user equipment, wherein the measurement configuration comprises a configuration for receiving and measuring at least one downlink reference signal from a base station;
receive from the user equipment a remote antenna panel measurement report based on the measurement configuration; and
send to the base station a first measurement report comprising the remote antenna panel measurement report.

12. The apparatus of claim 11, wherein:
the first measurement report further comprises a local antenna panel measurement report, and the local antenna panel measurement report is for an antenna panel of the apparatus.

13. The apparatus of claim 11, wherein the one or more processors are further configured to execute the instructions and cause the apparatus to:
send to the base station a second measurement report comprising a local antenna panel measurement report, wherein the local antenna panel measurement report is for an antenna panel of the apparatus.

14. The apparatus of claim 13, wherein the one or more processors are further configured to execute the instructions and cause the apparatus to:
receive from the base station a first measurement reporting resource configuration; and
send to the base station a request for a second measurement reporting resource configuration; and
send to the base station the second measurement report comprising the local antenna panel measurement report according to the second measurement reporting resource configuration.

15. The apparatus of claim 11, wherein in order to send to the user equipment the measurement configuration, the one or more processors are further configured to execute the instructions and cause the apparatus to send the measurement configuration on a sidelink connection between the apparatus and the user equipment.

16. The apparatus of claim 11, wherein in order to send to the user equipment the measurement configuration, the one or more processors are further configured to execute the instructions and cause the apparatus to send the measurement configuration on a Wi-Fi connection between the apparatus and the user equipment.

17. The apparatus of claim 11, wherein the measurement configuration comprises:
a measurement resource configuration;
a measurement reporting resource configuration;
an indication of a beamformed channel; and
one or more metrics for measurement.

18. The apparatus of claim 17, wherein the one or more metrics for measurement comprises one or more of a reference signal received power (RSRP), signal to interference plus noise ratio (SINR), received signal strength indicator (RSSI), pre-coding matrix indicator (PMI), channel quality indicator (CQI), and rank indicator (RI).

19. The apparatus of claim 11, wherein the first measurement report comprises a channel-state-information reference signal (CSI-RS) report.

20. The apparatus of claim 11, wherein the one or more processors are further configured to execute the instructions and cause the apparatus to receive from the user equipment an antenna panel configuration report.

21. A non-transitory computer-readable medium comprising computer-executable instructions that, when executed by one or more processors of a first user equipment, cause the first user equipment to perform a method for wireless communications, the method comprising:
sending, from the first user equipment to a second user equipment, a measurement configuration for an antenna panel of the second user equipment, wherein the measurement configuration comprises a configuration for receiving and measuring at least one downlink reference signal from a base station;
receiving, at the first user equipment from the second user equipment, a remote antenna panel measurement report based on the measurement configuration; and
sending, from the first user equipment to the base station, a first measurement report comprising the remote antenna panel measurement report.

22. The non-transitory computer-readable medium of claim 21, wherein:
the first measurement report further comprises a local antenna panel measurement report, and
the local antenna panel measurement report is for an antenna panel of the first user equipment.

23. The non-transitory computer-readable medium of claim 21, wherein the method further comprises:
sending, from the first user equipment to the base station, a second measurement report comprising a local antenna panel measurement report,
wherein the local antenna panel measurement report is for an antenna panel of the first user equipment.

24. The non-transitory computer-readable medium of claim 23, wherein the method further comprises:
receiving, at the first user equipment from the base station, a first measurement reporting resource configuration; and
sending, from the first user equipment to the base station, a request for a second measurement reporting resource configuration,
wherein the second measurement report comprising the local antenna panel measurement report is sent from the first user equipment to the base station according to the second measurement reporting resource.

25. The non-transitory computer-readable medium of claim 21, wherein sending, from the first user equipment to the second user equipment, the measurement configuration comprises sending the measurement configuration on a sidelink connection between the first user equipment and the second user equipment.

26. The non-transitory computer-readable medium of claim 21, wherein sending, from the first user equipment to the second user equipment, the measurement configuration comprises sending the measurement configuration on a Wi-Fi connection between the first user equipment and the second user equipment.

27. The non-transitory computer-readable medium of claim 21, wherein the measurement configuration comprises:
a measurement resource configuration;
a measurement reporting resource configuration;
an indication of a beamformed channel; and
one or more metrics for measurement.

28. The non-transitory computer-readable medium of claim 27, wherein the one or more metrics for measurement comprises one or more of a reference signal received power (RSRP), signal to interference plus noise ratio (SINR), received signal strength indicator (RSSI), pre-coding matrix indicator (PMI), channel quality indicator (CQI), and rank indicator (RI).

29. The non-transitory computer-readable medium of claim 21, wherein the first measurement report comprises a channel-state-information reference signal (CSI-RS) report.

30. An apparatus, comprising:
means for sending to a user equipment a measurement configuration for an antenna panel of the user equipment, wherein the measurement configuration comprises a configuration for receiving and measuring at least one downlink reference signal from a base station;
means for receiving from the user equipment a remote antenna panel measurement report based on the measurement configuration; and means for sending to the base station a first measurement report comprising the remote antenna panel measurement report.

* * * * *